(12) United States Patent
Siti et al.

(10) Patent No.: US 8,432,987 B2
(45) Date of Patent: Apr. 30, 2013

(54) METHOD AND APPARATUS FOR MULTIPLE ANTENNA COMMUNICATIONS, AND RELATED SYSTEMS AND COMPUTER PROGRAM

(75) Inventors: Massimiliano Siti, Peschiera Borromeo (IT); Alessandro Tomasoni, Lesmo (IT); Marco Pietro Ferrari, Milan (IT); Sandro Bellini, Monza (IT); Oscar Volpatti, Rovellasca (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 1235 days.

(21) Appl. No.: 12/077,073

(22) Filed: Mar. 14, 2008

(65) Prior Publication Data

US 2008/0310554 A1   Dec. 18, 2008
US 2012/0051463 A9   Mar. 1, 2012

Related U.S. Application Data

(63) Continuation-in-part of application No. 11/989,055, filed as application No. PCT/US2006/028256 on Jul. 20, 2006.

(60) Provisional application No. 60/700,773, filed on Jul. 20, 2005.

(30) Foreign Application Priority Data

Mar. 14, 2007   (WO) .................. PCT/IB2007/000630

(51) Int. Cl.
  *H04B 7/02*  (2006.01)
  *H04L 27/06*  (2006.01)

(52) U.S. Cl.
  USPC .......................................... 375/267; 375/340

(58) Field of Classification Search .................. 375/267, 375/340, 260, 259, 316
See application file for complete search history.

(56) References Cited

U.S. PATENT DOCUMENTS 7,251,768 B2    7/2007  Giannakis et al.
7,551,664 B2 *  6/2009  Zhang et al. .................. 375/147

(Continued)

FOREIGN PATENT DOCUMENTS

WO   WO 2007012053      1/2007
WO   WO 2007012053 A1 * 1/2007

OTHER PUBLICATIONS

I.Emre Telatar, "Capacity of Multi-Antenna Gaussian Channels," Eur. Trans. Tel., 10, 6, 585-595, Nov. 1999.

(Continued)

*Primary Examiner* — David C. Payne
*Assistant Examiner* — Brian J Stevens
(74) *Attorney, Agent, or Firm* — Bryan A. Santarelli; Graybeal Jackson LLP

(57) ABSTRACT

An embodiment of an arrangement detects sequences of digitally modulated symbols from multiple sources. The arrangement identifies a suitable set of candidate values for at least one transmitted sequence of symbols and determines for each candidate value a set of sequences of transmitted symbols. The arrangement estimates at least one further set of sequences of transmitted symbols, calculates a metric for each sequence of transmitted symbols, and selects the sequence that maximizes the metric. At the end, a-posteriori bit soft output information for the selected sequence is calculated from the metrics for said sequences. Generally, these calculations are based on the information coming from a channel-state-information matrix and a-priori information on the modulated symbols from a second module, such as a forward error-correction-code (ECC) decoder.

39 Claims, 6 Drawing Sheets

U.S. PATENT DOCUMENTS

| | | | |
|---|---|---|---|
| 7,616,695 B1 * | 11/2009 | Sarrigeorgidis | 375/260 |
| 8,069,399 B2 | 11/2011 | Osnato et al. | |
| 2004/0095993 A1 * | 5/2004 | Liu et al. | 375/219 |
| 2005/0281351 A1 * | 12/2005 | Jeong et al. | 375/267 |
| 2006/0188044 A1 | 8/2006 | Wang et al. | |
| 2009/0154599 A1 | 6/2009 | Siti et al. | |
| 2010/0111160 A1 | 5/2010 | Siti | |

OTHER PUBLICATIONS

G.J. Foschini and M. J.Gans, "On the Limits of Wireless Communication in a Fading Environment," Wireless Pers. Comm., 6, 311-355, Mar. 1998.

IEEE P802.11n™/D1.0, "Draft Amendment to STANDARD [...]—Part 11: Wireless LAN Medium Access Control (MAC) and Physical Layer (PHY) specifications: Enhancements for Higher Throughput", A. Stephens et al.

IEEE Project P802.16-2004/Cor1-D5, Draft Corrigendum to IEEE Standard for Local and Metropolitan Area Networks—Part 16: Air Interface for Fixed Broadband Wireless Access Systems.

Requirements and recommendations for WiMAX ForumTM Mobility Profiles, WiMAX, Service Providers Working Group, Nov. 9, 2005, pp. 1-34.

W. Van Etten, "Maximum Likelihood Receiver for Multiple Channel Transmission Systems", IEEE Transactions on Communications, vol. 24, No. 2, pp. 276-283, Feb. 1976.

Claude Berrou, Alain Glavieux and Punya Thitimajshima, "Near Shannon limit error-correcting coding and decoding: Turbo-codes", Proc. ICC 1993, pp. 1064-1070, May 1993.

Catherine Douillard, Michel Jezequel, Claude Berrou, Annie Picart, Pierre Didier and Alain Glavieux, "Iterative Correction of Intersymbol Interference: Turbo-Equalization", European Trans. on Telecomm. and Rel. Techn., vol. 6, pp. 507-511, Sep. 1995.

H. Vincent Poor and Sergio Verdu', "Probability of Error in MMSE Multiuser Detection", IEEE Transactions on Information Theory, vol. 43, May 1997, pp. 858-871.

P. W. Wolniansky, G. J. Foschini, G. D. Golden, R. A. Valenzuela, "V-Blast: An Architecture for Realizing Very High Data Rates Over the Rich-Scattering Wireless Channel," invited paper, Proc. ISSSE-98, Pisa, Italy, Sep. 29, 1998.

Gerard J. Foschini, Glen. D. Golden, Reinaldo A. Valenzuela, Peter W. Wolniansky, "Simplified Processing for High Spectral Efficiency Wireless Communication Employing Multi-Element Arrays," IEEE Journal on Selected Areas in Communications, vol. 17, No. 11, pp. 1841-1852, Nov. 1999.

Mathini Sellathurai and Simon Haykin, "Turbo-BLAST for Wireless Communications: Theory and Experiments", IEEE Transactions on Signal Processing, vol. 50, pp. 2538-2546, Oct. 2002.

Ben Lu, Guosen Yue, and Xiaodong Wang, "Performance Analysis and Design Optimization of LDPC-Coded MIMO OFDM Systems," IEEE Transactions on Signal Processing, vol. 52, No. 2, pp. 348-361, Feb. 2004.

Damien Zuyderhoff, Xavier Wautelet, Antoine Dejonghe and Luc Vandendorpe, "MMSE Turbo Receiver for space-frequency bit-interleaved coded OFDM", Proc. IEEE Vehicular Technology Conf., vol. 1, pp. 567-571, Oct. 2003.

Won-Joon Choi, Rohit Negi and John M. Cioffi, "Combined ML and DFE Decoding for the V-BLAST System", Proc. IEEE Int. Conf. on Communications, vol. 3, pp. 1243-1248, Jun. 2000.

Yuan Li and Zhi-Quan Luo, "Parallel Detection for V-BLAST System", IEEE GLOBECOM, vol. 1, pp. 340-344, May 2002.

Deric W. Waters and John R. Barry, "The Chase Family of Detection Algorithms for Multiple-Input Multiple-Ouput Channels", IEEE GLOBECOM, vol. 4, pp. 2635-2639, Nov. 2004.

Deric W. Waters and John R. Barry, "The Chase Family of Detection Algorithms for Multiple-Input Multiple-Ouput Channels", Submitted to IEEE Trans. on Information Theory, Sep. 2005.

Erik Agrell, Thomas Eriksson, Alexander Vardy and Kenneth Zeger, "Closest Point Search in Lattices," IEEE Trans. on Inf. Theory, vol. 48, No. 8, Aug. 2002.

Oussama Damen, Ammar Chkeif and Jean-Claude Belfiore, "Lattice Codes Decoder for Space-Time Codes", IEEE Commun. Letters, vol. 4, No. 5, pp. 161-163, May 2000.

Massimiliano Siti and Michael P. Fitz, "A Novel Soft-Output Layered Orthogonal Lattice Detector for Multiple Antenna Communications.", Proc. IEEE Int. Conf. on Communications, Jun. 2006.

Alessandro Tomasoni, Marco Ferrari, Devis Gatti, Fabio Osnato and Sandro Bellini, "A Low Complexity Turbo MMSE Receiver for W-LAN MIMO Systems", Proc. IEEE Int. Conf. on Communications, Jun. 2006.

Yutaka Yasuda, Kanshiro Kashiki and Yasuo Hirata, "High-Rate Punctured Convolutional Codes for Soft Decision Viterbi Decoding", IEEE Transactions on Communications, vol. COM-32, No. 3, pp. 315-319, Mar. 1984.

S. Dolinar, D. Divsalar, "Weight Distributions for Turbo Codes Using Random and Nonrandom Permutations", JPL TDA Progr, Rep., vol. 42-122, pp. 56-65, Aug. 1995.

Emanuele Viterbo, Joseph Boutros, "A Universal Lattice Code Decoder for Fading Channels," IEEE Trans. on Inf. Theory, vol. 45, No. 5, pp. 1639-1642, Jul. 1999.

Mohamed Oussama Damen, Hesham El Gamal, Giuseppe Caire, "On Maximum-Likelihood Detection and the Search for the Closest Lattice Point," IEEE Trans. on Inf. Theory, vol. 49, No. 10, pp. 2389-2402, Oct. 2003.

Richard Van Nee, Allert Van Zelst and Geert Awater, "Maximum Likelihood Decoding in a Space Division Multiplexing System," Awater, Proc. VTC 2000, vol. 1, 6-10.

IEEE 802.11-05/0149r1, "WWiSE Proposal: High throughput extension to the 802.11 Standard," C. Kose, B. Edwards et al.

Babak Hassibi, "An efficient square-root algorithm for BLAST," In Proc. ICASSP, Istanbul, Turkey, pp. 11737-11740, Jun. 2000.

G. H. Golub and C. F. Van Loan, "Matrix Computations", Johns Hopkins University Press, Baltimore, MD, 1996.

European Search Report, EP08152722, European Patent Office, Munich May 30, 2008.

Alessandro Tomasoni, Massimiliano Siti, Marco Ferrari, and Sandro Bellini, "Turbo-LORD: a MAP-approaching Soft-Input Soft-Output Detector for Iterative MIMO Receivers", Global Telecommunications Conference, 2007; IEEE Globecom 2007, pp. 3504-3508, XP031196593.

Massimiliano Siti and Michael P. Fitz, "On Layer Ordering Techniques for Near-optimal MIMO Detectors", 2007 8th IEEE Wireless Communications and Networking Conference, IEEE Piscataway, NJ, USA, 2007, pp. 1200-1205, XP007904694.

Massimiliano Siti and Michael P. Fitz, "On Reduced Complexity Soft-Output MIMO ML detection", IEEE Transactions on Information Theory, US, Mar. 24, 2006, pp. 1-43 XP007904695.

Luis G. Barbero and John S. Thompson, "Rapid Prototyping of a Fixed-Throughput Sphere Decoder for MIMO Systems", IEEE Int. Conf. on Communications, Jun. 2006, pp. 6.

Andreas Burg, Moritz Borgmann, Markus Wenk, Martin Zellweger, Wolfgang Fichtner, and Helmut Bolcskei, "VLSI implementation of MIMO detection using the sphere decoding algorithm", IEEE Journal of Solid-State Circuits, vol. 40, No. 7, Jul. 2005, pp. 1566-1577.

D. Wübben, R. Böhnke, J. Rinas, V. Kühn, and K. Kammeyer, "Efficient algorithm for decoding layered space-time codes," Electronic Letters, vol. 37, No. 22, Oct. 2001, pp. 1348-1350.

Deric W. Waters and John R. Barry, "Noise-predictive decision-feedback detection for multiple-input multiple-output channels," in press, IEEE Transactions on Signal Processing, vol. 53, No. 5, May 2005, pp. 1852-1859.

Bertrand M. Hochwald, Stephan ten Brink, "Achieving Near-Capacity on a Multiple-Antenna Channel," IEEE Trans, on Comms., vol. 51, No. 3, Mar. 2003, pp. 30.

Mong Suan Yee, "Max-log Sphere Decoder," ICASSP 2005, pp. 4.

Joseph Boutros, Nicolas Gresset, Loic Brunel and Marc Fossorier, "Soft-input soft-output lattice sphere decoder for linear channels," Globecom 2003, pp. 5.

IEEE 802.11-04/898r1, N. Moschini, M. Siti et al., "STMicroelectronics Partial Proposal for LDPCC as optional coding technique for IEEE 802.11 TGn High Troughput Standard", Aug. 2004, pp. 44.

IEEE 802.11-03/940r4, "IEEE P802.11, Wireless LANs—TGn Channel Models"—May 2004, pp. 49.

Arul D. Murugan, Hesham El Gamal, Mohamed Oussama Damen and Giuseppe Caire, "A Unified Framework for Tree Search Decoding: Rediscovering the Sequential Decoder", submitted to IEEE Transactions on Information Theory, vol. 52, No. 3, Mar. 2006, pp. 21.

G. H. Golub and C. F. Van Loan, "Matrix Computations", Johns Hopkins University Press, Baltimore, MD, 1996, chapter 4, "Special Linear System", pp. 75.

G. H. Golub and C. F. Van Loan, "Matrix Computations", Johns Hopkins University Press, Baltimore, MD, 1996, chapter 5, "Orthogonalization and Least Squares", pp. 71.

Deric W. Waters and John R. Barry, "The Sorted-QR Chase Detector for Multiple-Input Multiple-Output Channels", IEEE Communications Society, Wireless Communications and Networking Conference, 2005 IEEE New Orleans, LA, USA Mar. 13-17, 2005, pp. 538-543.

* cited by examiner

METHOD AND APPARATUS FOR MULTIPLE ANTENNA COMMUNICATIONS, AND RELATED SYSTEMS AND COMPUTER PROGRAM

PRIORITY CLAIM

The present patent application is a Continuation-in-Part of U.S. patent application Ser. No. 11/989,055, which has a 371(c) date of 18 Jan. 2008; which application claims priority to International Patent Application No. PCT/US2006/028256, filed 20 Jul. 2006; which application claims the benefit of U.S. Provisional Patent Application No. 60/700,773, filed 20 Jul. 2005; the present application also claims priority to International Patent Application No. PCT/IB2007/000630, filed 14 Mar. 2007.

RELATED APPLICATION DATA

This application is related to U.S. patent application Ser. No.: 12/531,297 entitled METHOD AND APPARATUS FOR MULTIPLE ANTENNA COMMUNICATIONS, COMPUTER PROGRAM PRODUCT THEREFOR, filed on Sep. 14, 2009.

TECHNICAL FIELD

An embodiment of the present invention relates to communication technology.

Specifically, an embodiment of the invention was developed by paying attention to its possible use in closely approximating a soft-output-maximum a posteriori detector in multiple antenna communications employing soft-bit information output by an outer error-correction-code decoder.

BACKGROUND

Throughout this description various publications are cited as representative of related art. For the sake of simplicity, these documents will be referred by reference numbers enclosed in square brackets, e.g., [x]. A complete list of these publications ordered according to the reference numbers is reproduced in the section entitled "List of references" at the end of the description. These publications are incorporated herein.

Wireless transmission through multiple antennas, also referred to as MIMO (Multiple-Input Multiple-Output) [1]-[2], currently enjoys great popularity because of the demand of high data rate communication from multimedia services. Many applications are considering the use of MIMO to enhance the data rate and/or the robustness of the link.

Among others, a significant example is provided by the next generation of Wireless Local Area Networks (W-LANs), see e.g., the IEEE 802.11n standard [3]. Another candidate application is represented by mobile "WiMax" systems for fixed wireless access (FWA) [4]-[5]. Besides fourth generation (4G) mobile terminals will likely endorse MIMO technology and as such may represent a very important commercial application for the present arrangement.

A current problem in this area is detecting multiple sources corrupted by noise in MIMO fading channels and generating bit soft output information to be passed to an external outer decoder.

The structure and operation of a narrowband MIMO system can be modelled as a linear complex baseband equation:

$$Y = HX + N \quad (1)$$

where Y is the received vector (size R×1), X the vector of transmitted complex Quadrature Amplitude Modulation (QAM) or Phase Shift Keying (PSK) constellation symbols (size T×1), H is the R×T channel matrix (R and T are the number of receive and transmit antennas, respectively) whose entries are the complex path gains from transmitter to receiver, samples of zero mean Gaussian random variables (RVs) with variance $\sigma^2 = 0.5$ per dimension. N is the noise vector of size R×1, whose elements are samples of independent circularly symmetric zero-mean complex Gaussian RVs with variance $N_0/2$ per dimension. S is the complex constellation size. Equation (1) is considered valid per subcarrier for wideband orthogonal frequency division multiplexing (OFDM) systems.

Maximum-A-Posteriori (MAP) detection is desirable to achieve high-performance, as this is the optimal detection technique in presence of additive white Gaussian noise (AWGN) [6]. If $M_C$ is the number of bits per modulated symbol, for every transmitted bit $b_k$, $k=1, \ldots, T \cdot M_C$ it computes the a-posteriori probability (APP) ratio conditioned on the received channel symbol vector $$Y: \frac{P(b_k = 1 \mid Y)}{P(b_k = 0 \mid Y)}$$

Practically, this is commonly handled in the logarithmic domain. Using Bayes' rule the a-posteriori log-likelihood ratios (LLRs) $L_{p,k}$ are computed as $$L_{p,k} = \ln \frac{P(b_k = 1 \mid Y)}{P(b_k = 0 \mid Y)} = \ln \frac{\sum_{X \in S_+^k} p(Y \mid X) p_a(X)}{\sum_{X \in S_-^k} p(Y \mid X) p_a(X)} \quad (2)$$

where $s_+^k$ is the set of $2^{T \cdot M_C - 1}$ bit sequences having $b_k = 1$, and similarly $s_-^k$ is the set of bit sequences having $b_k = 0$; $p_a(X)$ represent the a-priori probabilities of X. They can be neglected if equiprobable symbols are considered, and in this case (2) reduces to the maximum-likelihood (ML) metric.

This is not true when extrinsic information is output by an outer decoder, i.e., in iterative schemes, after the first detection-decoder stage is performed. The basic idea of combined iterative detection and decoding schemes is that the soft-output decoder and the detector exchange and update extrinsic soft information in an iterative fashion, according to a "turbo" decoding principle, in analogy to the iterative decoders first proposed for the Turbo Codes [7] and the subsequent turbo equalization schemes [8] to mitigate inter-symbol interference (ISI) in time varying fading channels.

A general block diagram of such a system is portrayed in FIGS. 4A and 4B that will be further discussed in the following.

Such schemes correspond to replacing the inner soft-in soft-out (SISO) decoder in [7] by the MIMO soft-out detector, and can be considered a turbo spatial-equalization scheme. They were first introduced in [12] and called "Turbo-BLAST". Other references of interest in that respect are [13]-[14].

From the MIMO system shown in equation (1) and assuming the Channel State Information (CSI) H at the receiver is known, one has:

$$p(Y \mid X) \propto \exp\left[-\frac{1}{2\sigma_N^2}\|Y - HX\|^2\right]$$

through a proportionality factor that can be neglected when substituted in equation (2) and where $\sigma_N^2 = N_0/2$. Denoting with $L_{a,j}$ the LLRs output by the decoder of the j-th bit in the transmitted sequence X, i.e., the a-priori (logarithmic) bit probability information, and considering independent bit in a same modulated symbol, equation (2) can be further developed as:

$$L_{p,k} = \ln \frac{\sum_{X \in S_+^k} \exp\left(-\frac{1}{N_0}\|Y - HX\|^2 + \sum_{j=1}^{TM_c} b_j(X)\frac{L_{a,j}}{2}\right)}{\sum_{X \in S_-^k} \exp\left(-\frac{1}{N_0}\|Y - HX\|^2 + \sum_{j=1}^{TM_c} b_j(X)\frac{L_{a,j}}{2}\right)} \quad (3)$$

where $b_j(X) = \{\pm 1\}$ indicates the value of the j-th bit in the transmitted sequence X in binary antipodal notation.

Maximum A-posteriori Probability (MAP)—or also Maximum Likelihood (ML)—detection involves an exhaustive search over all the possible $S^T$ sequences of digitally modulated symbols: such a search becomes increasingly unfeasible with the growth of the spectral efficiency.

From equation (3) the following metric can be identified:

$$D(X) = -\frac{1}{N_0}\|Y - HX\|^2 + \sum_{j=1}^{TM_c} b_j(X)\frac{L_{a,j}}{2} = -D_{ED} + D_a \quad (4)$$

where $D_{ED}$ is Euclidean distance (ED) term and $D_a$ is the a-priori term. The summation of exponentials involved in equation (4) is usually approximated according to the so-called "max-log" approximation:

$$\ln \sum_x \exp[D(X)] \cong \ln \max_x \exp[D(X)] \quad (5)$$

Then equation (2) can be re-written as:

$$L_{p,k} \cong \max_{X \in S_+^k} D(X) - \max_{X \in S_-^k} D(X) \quad (6)$$

corresponding to the so-called max-log-MAP detector. To conclude the description of the ideal detector, the a priori information $L_{a,k}$ is subtracted, so that the detector outputs the extrinsic information $L_{e,k}$ to be passed to an outer decoder:

$$L_{e,k} = L_{p,k} - L_{a,k} \quad (7)$$

Because of their reduced complexity, sub-optimal linear detection procedures like Zero-Forcing (ZF) or Minimum Mean Square Error (MMSE) [9] are widely employed in wireless communications. To improve their performance, nonlinear detectors based on the combination of linear detectors and spatially ordered decision-feedback equalization (O-DFE) were proposed in [10]-[11]. There, the principles of interference cancellation and "layer" (i.e., antenna) ordering are established: accordingly, in the remainder of this document the terms "layer" and "antenna" will be used as synonymous.

The related systems suffer from performance degradation due to noise enhancements and error propagation; moreover, they are not suitable for soft-output generation.

More attractive for bit interleaved coded modulation (BICM) systems are soft interference cancellation (SIC) iterative MMSE and error correction decoding strategies [12]-[14]. They represent a suboptimal way to compute equations (2)-(3) where the ED term in (4) is replaced by linear MMSE filtering and interference cancellation. Unfortunately they suffer from latency and complexity disadvantages, and also their performance can be significantly improved, as shown in the present document.

Another important class of detectors is represented by the so-called list detectors [15]-[18]. These are based on a combination of the ML and DFE principles. The basic common idea exploited in list detectors (LD) is to divide the streams to be detected into two groups: first, one or more reference transmit streams are selected and a corresponding list of candidate constellation symbols is determined; then, for each sequence in the list, interference is cancelled from the received signal and the remaining symbol estimates are determined by as many sub-detectors operating on reduced size sub-channels. By searching all possible S cases for a reference layer, adopting O-DFE for the remaining T-1 sub-detectors, and utilizing a properly optimized layer ordering technique, a LD is able to maintain degradation within fractions of a dB in comparison with ML performance.

Notably, this can be accomplished through a parallel implementation. A drawback of this approach lies in that the computational complexity is high as T O-DFE detectors for T-1 sub-streams have to be computed. If efficiently implemented, it involves $O(T^4)$ complexity. Another major shortcoming of the prior work in list based detection is the absence of a procedure to produce soft bit metrics for use in coding and decoding procedures. For this reason, also Turbo or equivalently iterative SIC schemes have not been designed for LDs.

Another important family of ML-approaching detectors is based on lattice decoding procedures, applicable if the received signal can be represented as a lattice [19]-[20]. The so-called Sphere Decoder (SD) [25]-[26] is the most widely known example for these detectors and can be utilized to attain hard-output ML performance with significantly reduced complexity. However SD suffers from some important disadvantages, most notably, is not suitable for a parallel VLSI implementation; the number of lattice points to be searched is non-deterministic, sensitive to the channel and noise realizations, and to the initial radius. This is not desirable for real-time high-data rate applications. Finally, generation of soft output metrics is not easy with known lattice decoding procedures. As said for LDs, for this reason also Turbo or equivalently iterative SIC schemes have not been designed in conjunction with SD.

Besides performance (the benchmarks are optimal ML detection and linear MMSE, ZF on the two extremes, respectively) at least four basic features should be complied with by a MIMO detection arrangement in order to be effective and implementable in next generation wireless communication procedures:

high (i.e., optimal or near-optimal) performance;
reduced overall complexity;

the capability of generating bit soft output values, as this yields a significant performance gain in wireless systems employing error correction codes (ECC) coding and decoding procedures;

the capability of the architecture of the procedure to be parallelized, which is significant for an Application Specific Integrated Circuit (ASIC) implementation and also to yield the low latency required by a real-time high-data rate transmission.

SUMMARY

An embodiment of the invention provides a fully satisfactory response to those features, while also avoiding the shortcomings and drawbacks of the prior art arrangements as discussed in the foregoing.

One or more embodiments of the invention relate to a method, a corresponding apparatus (a detector and a related receiver), as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the method to be implemented in a distributed/modular fashion among software and hardware components.

An embodiment described herein provides a method and apparatus to detect sequences of digitally modulated symbols, transmitted by multiple sources (e.g., antennas) and generate near-optimal extrinsic bit soft-output information from the knowledge of the a-priori information from an outer module, namely a soft-output error correction code decoder, providing:

soft-output performance very close to that of the optimal MAP technique;

implementation complexity extremely lower than that of the impractical MAP and high degree of parallelism as may be required by VLSI chip realizations.

No other soft-output MAP or near-MAP detectors able to yield at the same time good performance and a structure desirable for VLSI implementations have been proposed by others.

Such extrinsic information represents a refined version of the original input a-priori information and is then typically useful in iterative schemes featuring an inner detector, a deinterleaver, an outer module like a SISO error correction code decoder, and an interleaver on the feedback path.

An embodiment of the arrangement described herein is a detector wherein, if no a-priori information is available from an outer decoder, the detector achieves optimal or near-optimal max-log performance using two or more than two transmit antennas respectively. Conversely, if a-priori information is fed back to the detector from an outer decoder, then the detector provides a high performance and computationally efficient iterative or "turbo" scheme including the detector, acting as "inner" module, the outer decoder, and optionally an interleaver and related deinterleaver. Optionally, all, or part of the layers (or antennas, or sources) considered for the detection can be ordered employing properly devised techniques.

In brief, an embodiment of the arrangement described herein provides a simplified yet near-optimal method to compute equation (6), and therefore equation (7): i.e., it finds subsets of $s_+^k$ ($s_-^k$) with much lower cardinality and allowing a close approximation of the final result (6).

A possible embodiment of the arrangement described herein overcomes the limitations of the prior arrangements discussed in the foregoing, by means of a detector for multiple antenna communications that detects sequences of digitally modulated symbols transmitted by multiple antennas, or sources, processes "a-priori" input bit soft information output by an outer decoder, and generates "extrinsic" bit soft-output information to be passed back to an external decoder. The decoder is thus in position to generate improved "a-priori" information to be fed back to the detector for a further "iteration". The process ends after a given number of loops or iterations are completed.

A possible embodiment of the arrangement described herein concerns a detector comprising several stages adapted to operate, for example, in the complex or real domain, respectively. Firstly, by operating in the real domain only, the system is translated into the real domain through a novel lattice representation. Then, the (real or complex) channel matrix undergoes a "triangularization" process, meaning that through proper processing it is factorized in two or more product matrices of which one is triangular. Finally, the maximization problems expressed by equation (6) above is approximated by using two basic concepts: (a) determining a suitable subset of all the possible transmit sequences; (b) performing an approximate maximization of the two terms in (6) through separately maximizing the two metrics ($-D_{ED}$) and $D_a$ (4) over suitably selected reduced sets of transmit sequences.

The basic idea to maintain low complexity is to resort to the principle of successive layer detection, or spatial DFE (Decision-Feedback Equalization), but taking into account in addition also the information provided by the a-priori metric $D_a$. No other near-MAP detectors able to efficiently process $D_a$ have been proposed. Again, additionally, and optionally, all or part of the layers considered for the detection can be ordered employing a properly designed layer ordering technique.

Overall, an embodiment of the arrangement described herein achieves optimal max-log ML performance for two transmit antennas if no a-priori information is available from an outer decoder, and near-optimal for more than two transmit antennas. If a-priori information is available from the decoder, an embodiment of the invention computes near-optimal bit APPs to be passed to an external decoder. In all cases, the embodiment yields performance very close to that of the optimum MAP (ML if no a-priori information is available at the input of the detector) and has a much lower complexity as compared to a MAP (or ML) detection method and apparatus, and to the other state-of-the-art detectors having near-MAP (near-ML) performance. If more than two transmit sources are present, the order of all, or part of, the layers considered for detection may affect the performance significantly.

Advantageously, an embodiment described herein involves ordering all, or part of, the sequence of layers considered for the detection process.

This embodiment is thus suitable for highly parallel hardware architectures, and is thus adapted for VLSI implementations and for applications requiring a real-time (or in any case low latency) response.

Specifically, this embodiment concerns a combined detector and decoder of multiple antenna communications, that exchange specific quantities (extrinsic and a-priori soft information, often in the logarithmic domain, LLRs) in an iterative fashion. The iterative detector can be implemented in hardware (HW) according to several different architectures.

At a general level, it is intended that at least the three following options are considered as possible HW implementations for an embodiment of the present invention:

1) data re-circulation using one HW instantiation of the loop depicted in FIG. 2 can be performed at a higher frequency clock than the output data rate required by the considered application;

2) a pipelined HW structure built by cascading several instantiations, one per each iteration, of the series of inner detector, optional deinterleaver, outer decoder, optional interleaver; the block diagram is depicted in FIG. 2. Compared to the above reported HW structure: if N is the number of iterations, for a same clock frequency, N times higher speed (i.e., data rate) can be achieved at the expense of N times HW complexity;

3) any combination of the above reported HW structures.

Additionally and optionally, all—or part of—the layers considered for the detection can be ordered employing a suitably designed ordering technique. An embodiment of the layer ordering method includes the following sequence of steps, to be repeated a given number of times according to the implemented ordering technique: permuting pairs of columns of the channel matrix; pre-processing the permuted channel matrix in order to factorize it into product terms of which one is a triangular matrix; based on the processed channel coefficients, defining and properly computing the post-processing SNR for the considered layers; based on the value of the aforementioned SNRs, determining the order of the layers by applying a given criterion.

In an embodiment the number of receiving antennas is equal to the number of transmitting antennas minus one. In this case, the complex channel state information matrix H might be processed by factorizing the channel state information matrix H into an orthogonal matrix and a triangular matrix with its last row eliminated.

BRIEF DESCRIPTION OF THE DRAWINGS

For a more complete understanding of this disclosure and its features, reference is now made to the following description of exemplary embodiments, taken in conjunction with the accompanying drawings.

DETAILED DESCRIPTION

FIGS. 1A through 6B and the various embodiments described in this disclosure are by way of illustration only and should not be construed in any way to limit the scope of the invention. Those skilled in the art will recognize that the various embodiments described in this disclosure may easily be modified and that such modifications fall within the scope of this disclosure.

Figure 1A:
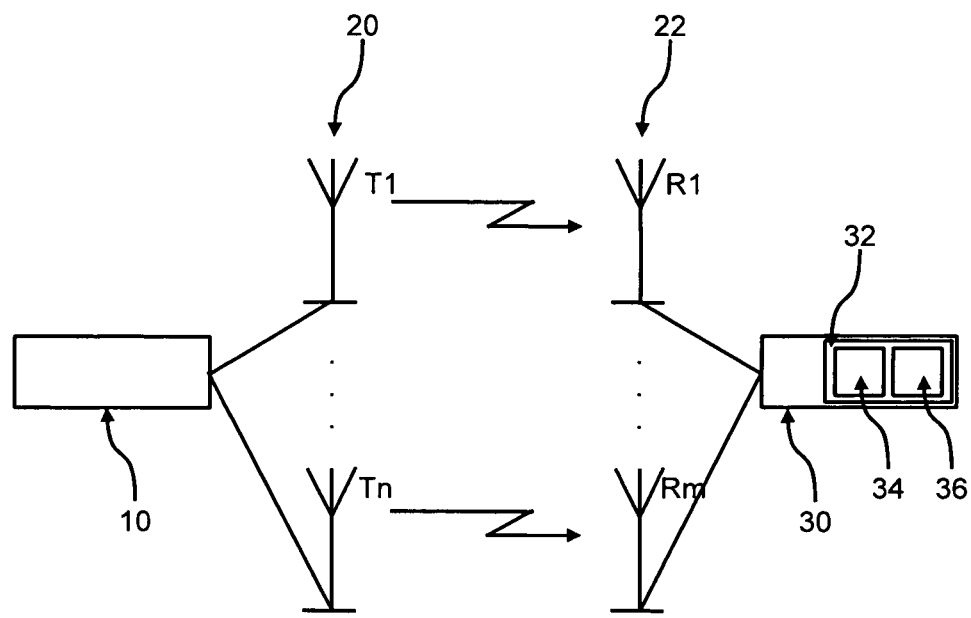
FIGS. 1A and 1B illustrate example systems for detecting communications from multiple sources in accordance with this disclosure.
Figure 1B:
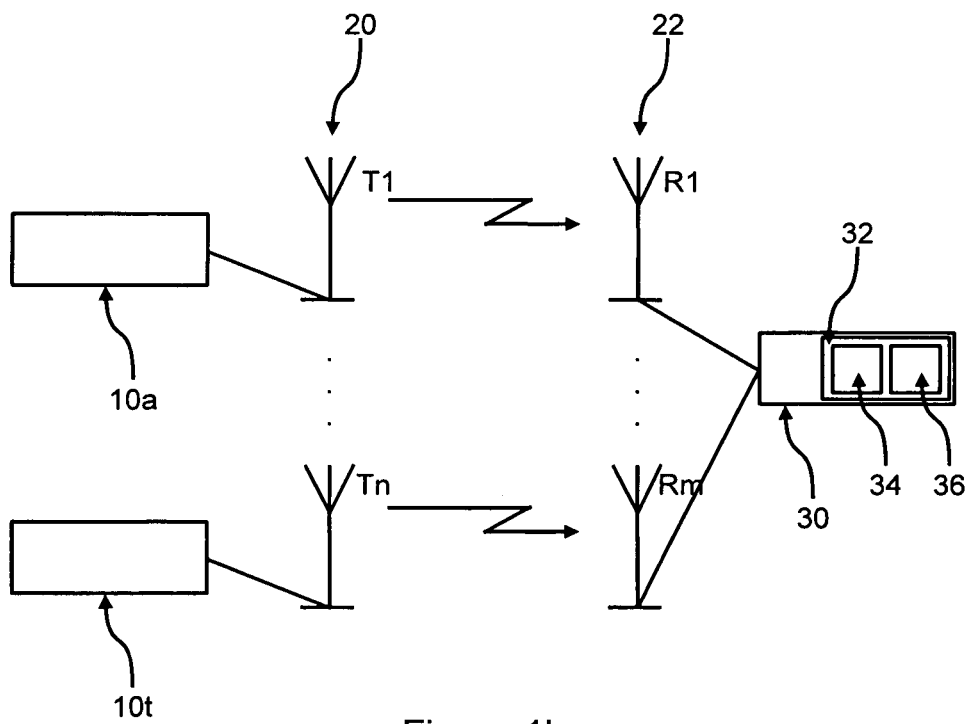

FIGS. 1A and 1B illustrate exemplary systems for detecting multiple communication sources in accordance with this disclosure. In particular, FIGS. 1A and 1B illustrate example MIMO systems. These embodiments are for illustration only. Other embodiments of the systems could be used without departing from the scope of this disclosure.

As shown in FIG. 1A, the system includes a transmitter 10 and a receiver 30. The transmitter 10 includes or is coupled to multiple transmit antennas 20 (denoted T1-Tn), and the receiver 30 includes or is coupled to multiple receive antennas 22 (denoted R1-Rm). Typically, each receive antenna 22 receives signals from all of the transmit antennas 20, and where m is the number of receive antennas and n is the number of transmit antennas, $m \geq n-1$ in an embodiment.

As shown in FIG. 1B, the system could also include multiple transmitters 10a-10t and the receiver 30. In this example, each of the transmitters 10a-10t includes or is coupled to a single transmit antenna 20.

Each of the transmitters 10, 10a-10t in FIGS. 1A and 1B represents any suitable device or component capable of generating or providing data for communication. The receiver 30 represents any suitable device or component capable of receiving communicated data.

In these examples, the receiver 30 includes an iterative detector and decoder 32, which detects multiple communications from multiple sources and computes a-posteriori soft-output information. The multiple sources could include a single transmitter 10 with multiple antennas 20, multiple transmitters 10a-10t with one or several antennas 20 each, or a combination thereof. The iterative detector and decoder 32 may operate as described in more detail below.

The block 32 includes any hardware, software, firmware, or combination thereof for detecting multiple communications from multiple sources. The block 32 could be implemented in any suitable manner, such as by using an Application Specific Integrated Circuit ("ASIC"), Field Programmable Gate Array ("FPGA"), digital signal processor ("DSP"), or microprocessor. As a particular example, the block 32 could include one or more processors 34 and one or more memories 36 capable of storing data and instructions used by the processors 34.

Either of the systems can be represented as in equation (1) above, which may be valid for both single-carrier flat fading MIMO systems and for wideband OFDM systems (per subcarrier). The interpretation of equation (1) is that the signal received at each antenna 22 by the receiver 30 represents the superposition of T transmitted signals corrupted by multiplicative fading and AWGN.

Although FIGS. 1A and 1B illustrate examples of systems for detecting multiple communication sources, various changes may be made to FIGS. 1A and 1B. For example, a system could include any number of transmitters and any number of receivers. Also, each of the transmitters and receivers could include or be coupled to any number of antennas.

Figure 2:
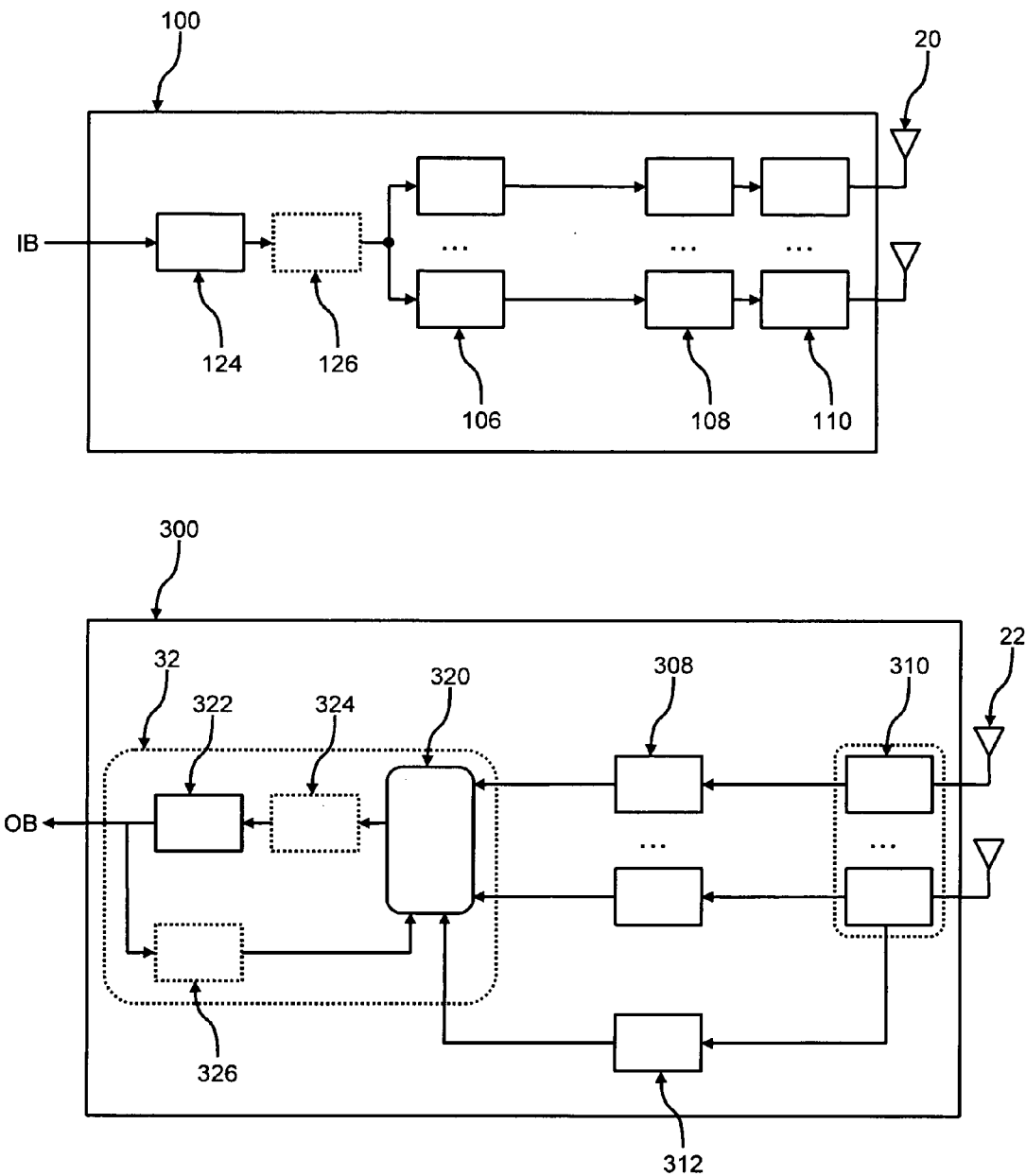
FIG. 2 illustrates a typical single-carrier MIMO transmitter and related receiver in accordance with this disclosure.

FIG. 2 illustrates a more detailed example of a single carrier MIMO transmitter and receiver. Typical transmitter baseband digital elements/procedures are grouped as 100. As a counterpart, block 300 represents typical baseband elements/procedures of a receiver.

In particular, an embodiment of the iterative detection and decoder 32 (FIG. 1) includes as distinguishable units a MIMO detector 320, a deinterleaver 324, a FEC decoder 322 and an interleaver 326. Interleaver 326 is implemented according to the same permutation law as interleaver 126, the latter being at the transmitter side, with the difference that the interleaver 126 has (hard-decision) bit input/output, while the interleaver 326 has soft bit information input/output. Deinterleaver 324 implements the reciprocal permutation law of blocks 126 and 326. Blocks 324 and 326 are optionally present as components of block 32.

As well known to those skilled in the art, the block 100 further has associated therewith a FEC encoder 124, and a set of mapper blocks 106, filter blocks 108 and digital-to-analog (D/A) converters 110 in order to convert an input bit stream IB for transmission over the set of transmission antennas 20.

Similarly the block 300 has additionally associated therewith a set of analog-to-digital (A/D) converters 310 and filter blocks 308 for each of the antennas 22 of the receiver, providing the received data to the detector 32, which creates the final output bit stream OB. Again those skilled in the art will appreciate the presence of a channel estimator 312 in the receiver block 300, which provides respective channel estimation data to the MIMO detector 320. Any channel estimator may be used, and any forward error correction (FEC) code might be used in the FEC encoder 124 and FEC decoder 326, such as Reed-Solomon, convolutional, low-density parity check code, and turbo encoding schemes.

Again, these embodiments are for illustration only. Other embodiments of the systems 100, 300 and 32 may be used without departing from the scope of this disclosure.

The deinterleaver 324 and the interleaver 326 are optional in the sense that their usefulness depends on the adopted error correction code. In some cases they could be eliminated without impairing the performance of the receiver.

Figure 3:
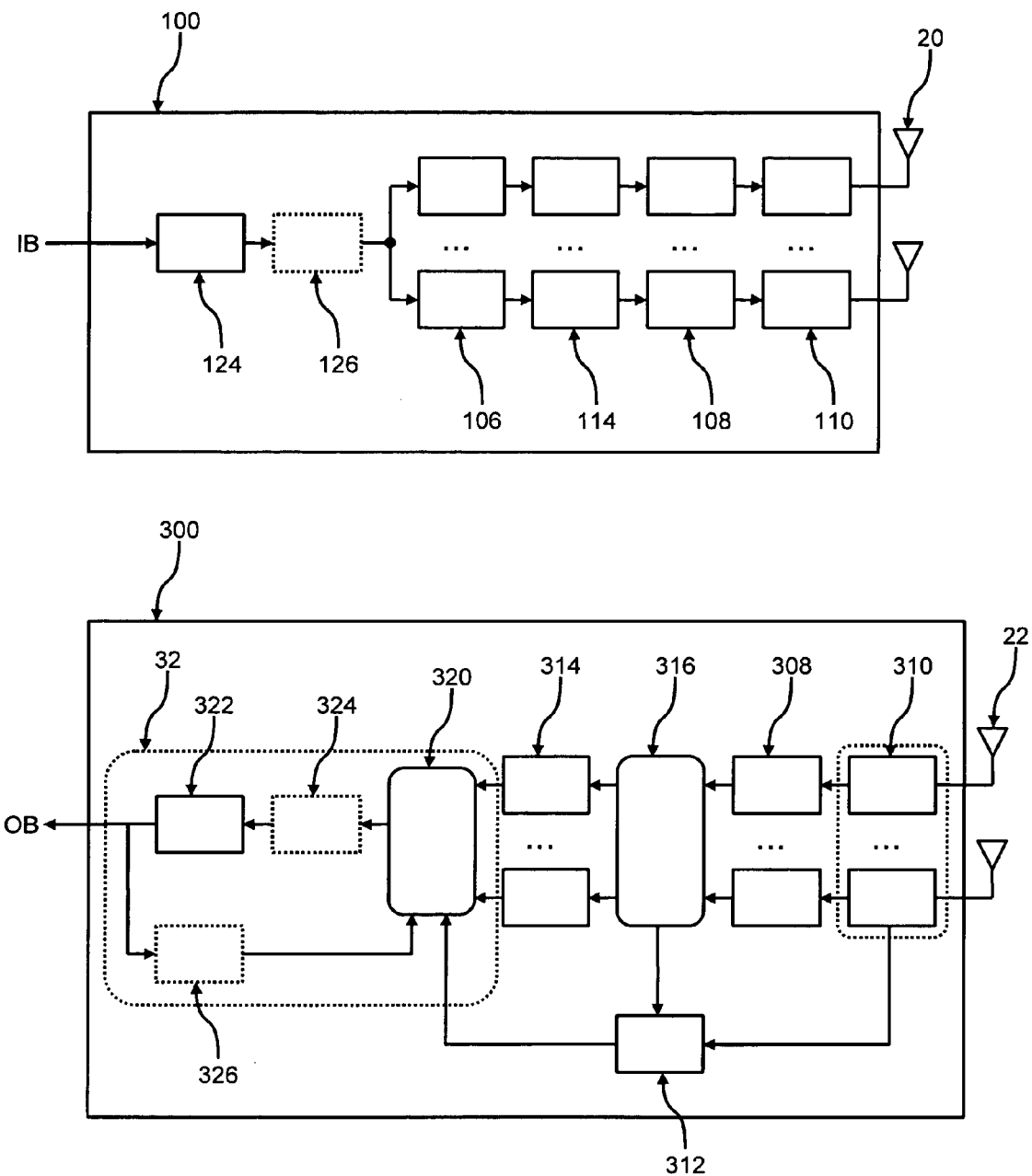
FIG. 3 illustrates a typical MIMO-OFDM transmitter and related receiver in accordance with this disclosure.

FIG. 3 illustrates an alternative embodiment of a MIMO-OFDM transmitter and receiver. Again, typical transmitter baseband digital elements/procedures are grouped as 100 and typical receiver baseband elements/procedures are grouped as 300.

In particular, the iterative detection and decoder 32 typically includes as distinguishable units a MIMO-OFDM detector 320, a deinterleaver 324, a FEC decoder 322 and an interleaver 326. Interleaver 326 is implemented according to the same permutation law as 126, the latter being at the transmitter side, with the difference that the interleaver 126 has (hard-decision) bit input/output, while the interleaver 326 has soft bit information input/output. Deinterleaver 322 implements the reciprocal permutation law of 126 and 326.

In comparison to the transmission system of FIG. 2, the system of FIG. 3 further includes a set of framing and OFDM modulator blocks 114 at the transceiver side and the respective OFDM demodulator and deframing blocks 314 at the receiver side. As well known to those skilled in the art a typical receiver further includes a synchronisation block 316 for improving the channel estimation by the block 312.

Blocks 324 and 326 are optionally present as components of 32.

In the following will be explained embodiments of single-carrier and OFDM transmission systems, with particular attention being paid to the presence of the interleaver 326 and the deinterleaver 324. Once again, these embodiments are for illustration only. Other embodiments of the systems 100, 300 and specifically 32 could be used without departing from the scope of this disclosure.

Figure 4A:
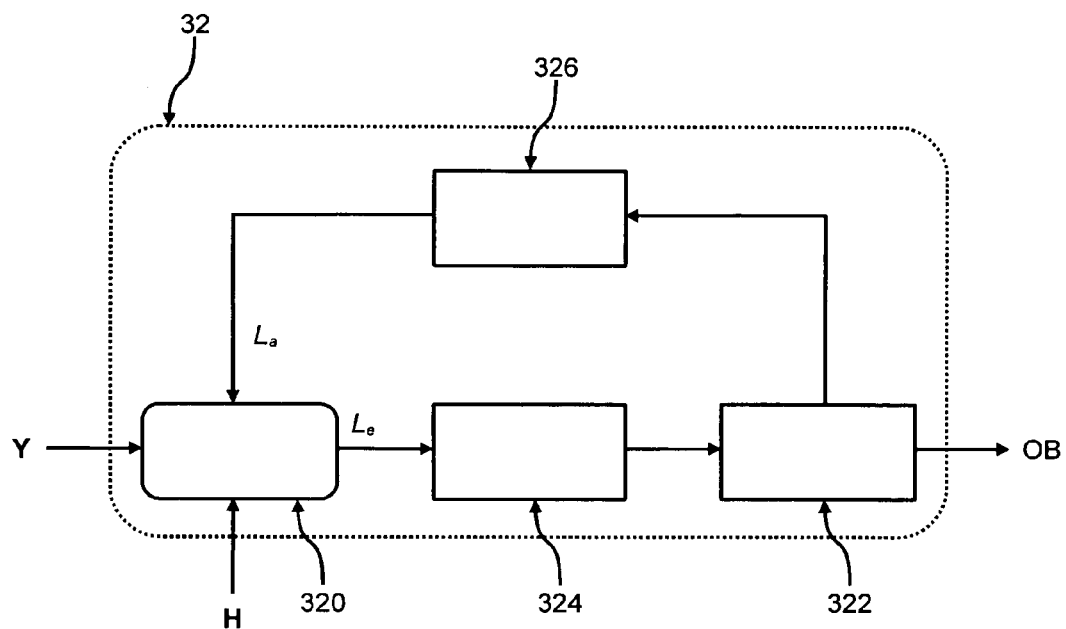
FIGS. 4A and 4B illustrate example of two alternative single-carrier methods for computing a-posteriori soft-output information of multiple sources adapted for use in accordance with this disclosure.
Figure 4B:
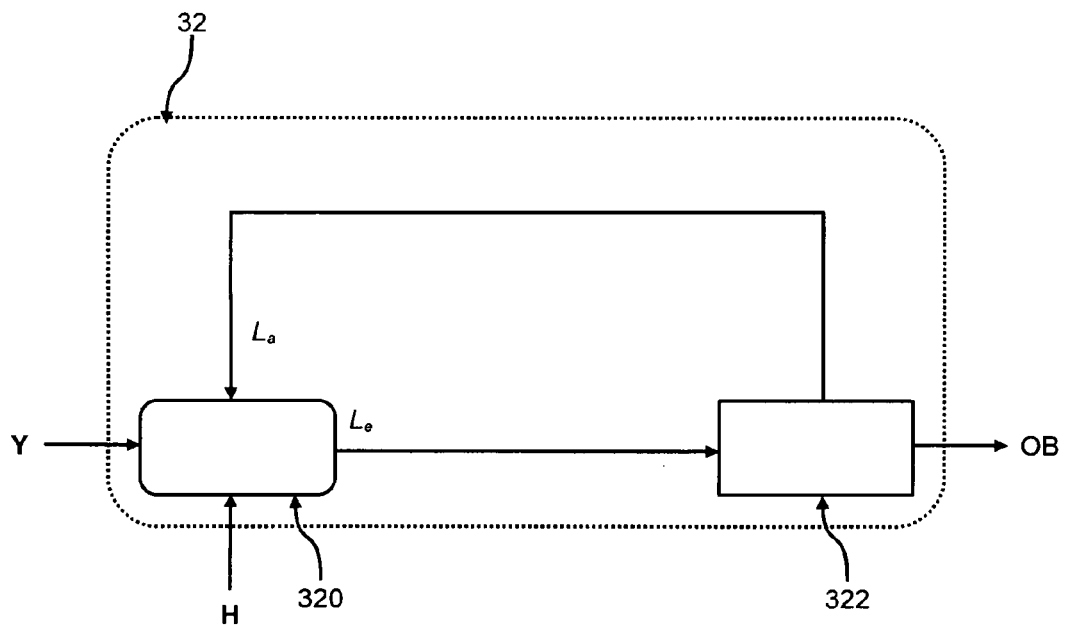

Two general block diagrams, alternative to each other, are represented in FIGS. 4A and 4B.

The deinterleaver 324 and the interleaver 326 are optional in the sense that their usefulness depends on the adopted error correction code. In fact, FIG. 4B shows the same iterative loop as of FIG. 4A, however, without the interleaver 326 and deinterleaver 324. In some cases they could be eliminated without impairing the performance of the receiver.

The detector 320 receives as input the received signal Y, as shown, e.g., in equation (1), the channel estimates, such as the channel estimation matrix H as shown in equation (1), and the a-priori bit soft information, such as the a-priori bit LLRs $L_a$, and then approximates internally the a-posteriori LLRs $L_p$ and outputs the extrinsic information $L_e$. Unless otherwise stated, the bit soft-output generation will be referred to in the logarithmic domain with no loss of generality, i.e., it is intended the ideas will remain valid if other implementation choices are made, i.e., of regular probabilities instead of LLRs are dealt with.

More specifically, FIGS. 4A and 4B illustrate two alternative methods to implement the single carrier MIMO iterative detector and decoder 32. The MIMO detector 320 in both figures receives as input the received sequence Y and the estimated CSI H.

FIG. 4A uses a deinterleaver 324 having as input the bit soft-output information output by the MIMO detector 320, and a reciprocal interleaver 326 having as input the bit soft-output information output by a SISO FEC decoder 322.

The flow is repeated for a given number of iterations and the decoder 322 determines the final output bit stream OB.

FIG. 4B is the same as FIG. 4A except that the deinterleaver 324 and the reciprocal interleaver 326 are not present.

Figure 5A:
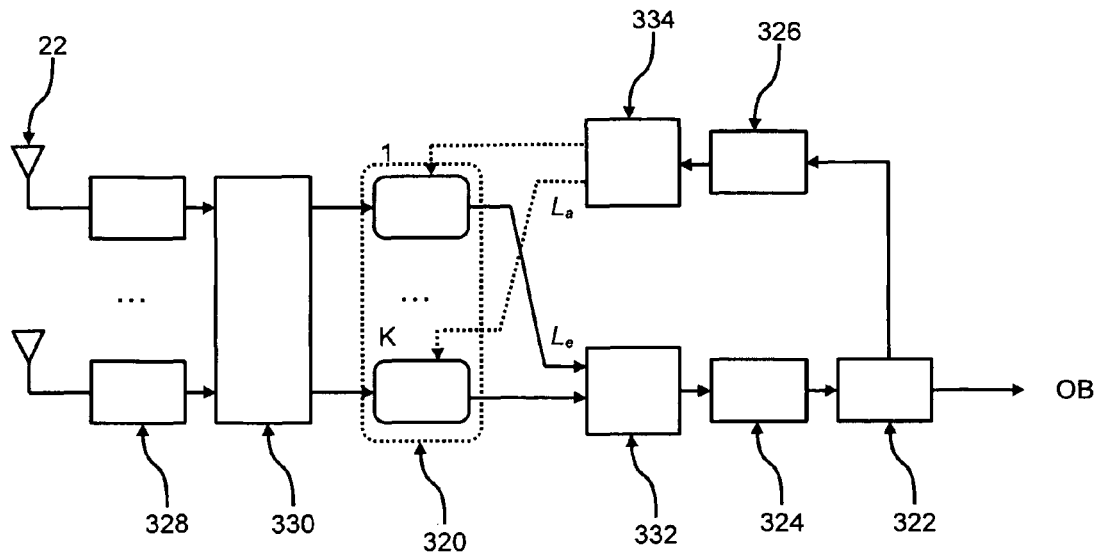
FIGS. 5A and 5B illustrate example of two alternative OFDM methods for computing a-posteriori soft-output information of multiple sources for use in accordance with this disclosure.
Figure 5B:
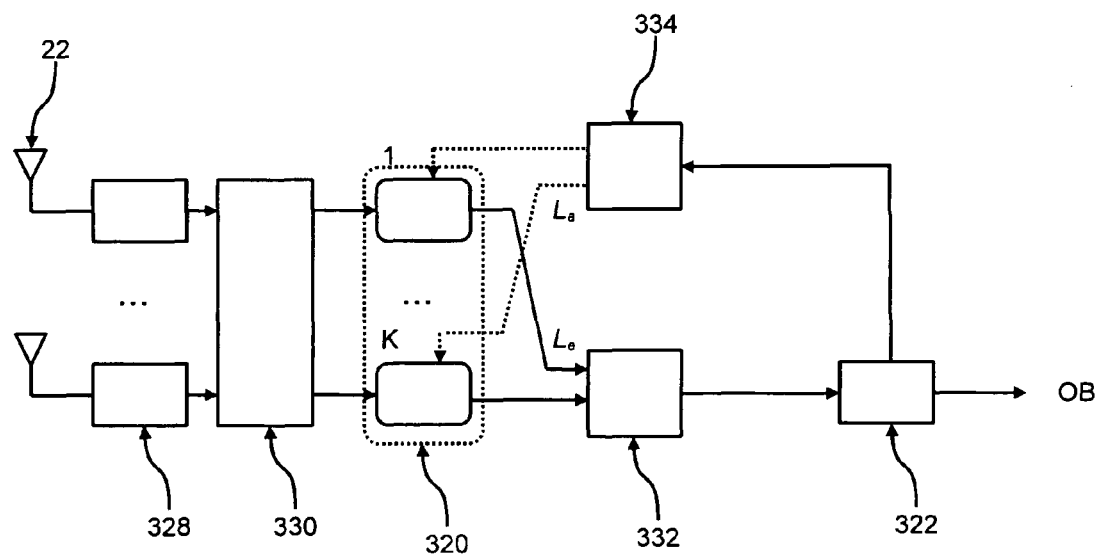

FIGS. 5A and 5B illustrate two alternative methods to implement the MIMO-OFDM iterative detection and decoder 32.

The MIMO detector 320 in both figures receives as input the received sequence Y and the estimated CSI H relatively to a set of OFDM subcarriers.

As well known to those skilled in the art, the data coming from the R antennas 22 of the receiver can be converted into the K OFDM subcarriers, e.g., by means of a set of Fast Fourier Transformation (FFT) blocks 328 and a multiplexer 330. The single-carrier case of FIGS. 2, 4A and 4B can be considered as a special case of such a system when K=1.

At least one detector block 320 then processes the K OFDM subcarriers. This can be done serially, in parallel by means of K detector blocks or any combination of both. The parallel structure represented in FIGS. 5A and 5B is considered as an example only and is not limiting.

The outputs of the detector units 320 are then serialized by means of the parallel to serial (P/S) converter block 332.

FIG. 5A uses a deinterleaver 324 having as input the bit soft-output information output by the converter block 332, and a reciprocal interleaver 326 having as input the bit soft-output information output by a SISO FEC decoder 322.

The output of the interleaver 326 is demultiplexed by a serial to parallel (S/P) converter block 334 and fed back to the detector units 320 according to the OFDM subcarriers the soft bits output by 334 belong to. The flow is repeated for a given number of iterations and the decoder 322 provides the output bit stream OB.

FIG. 5B shows the same scheme as FIG. 5A except that the deinterleaver 324 and the reciprocal interleaver 326 are not present.

Unless otherwise stated, the description herein deals with probability ratios in the logarithmic domain, i.e., LLRs represent the input-output soft information, but the same ideas and procedures can be generalized in a straightforward manner to the case of regular probabilities.

As indicated, the arrangement described herein deals with a simplified yet near-optimal method to compute equation (6), and therefore equation (7). Namely, at each iteration the arrangement finds subsets of $s_+^k$ ($s_-^k$), which have a reduced cardinality and which allow an approximation of the final result of equation (6).

The arrangement described herein deals with the problem of bit soft output generation as a function of the candidate symbols transmitted in turn by each transmit antenna. This means that even if for the sake of conciseness the following embodiments are described with reference to a generic transmit antenna t, the related processing is intended to be repeated for T times with t=1, . . . T respectively.

More precisely, generating bit soft-output information for the bits corresponding to the symbols transmitted by all the antennas (or sources) comprises repeating the considered steps and operations a number of times equal to the number of transmit antennas (or sources), each time associated with a different disposition of layers corresponding to the transmitted symbols, each layer being a reference layer in only one of the dispositions, and disposing the columns of the channel matrix accordingly prior to further processing. The meaning of 'reference layer' will be clear from the following descriptions.

In other words the arrangement determines overall T subsets $U_t$ of the entire possible transmitted symbol sequence set. Each subset has per iteration cardinality $WS_C$, with $S_C \leq 2^{Mc}$, instead of $2^{TMc}$ of the whole set.

W depends upon the chosen embodiment. It can be kept constant (i.e., independent of T) in some embodiments, thus resulting in a complexity of the demodulation that linearly grows with T, instead of exponentially growing.

The entire process is repeated for a number of stages (or iterations), wherein a modified version of the a-priori LLRs $L_a$ is output by decoder at each iteration. At each iteration, the detector processes the a-priori LLRs $L_a$ and subtracts them from $L_p$ of equation (6) to compute equation (7).

In order to compute the bit LLRs corresponding to transmit antenna t a suitable set of transmit sequences X can be generated as will be explained in the following. The following description refers to a single iteration and it is to be understood that said extrinsic information ($L_e$) is calculated in at least two processing instances (i.e. stages, or iterations) by:
calculating in a first instance the extrinsic information ($L_e$) without any a-priori information ($L_a$), and
calculating in a second instance the extrinsic information ($L_e$) from the a-priori information ($L_a$) fed back from a module such as a forward error correction code decoder, until a decision on the bit value is made after a given number of instances.

It should be understood that the term iterations or stages are exchangeable, because the arrangement could be implemented by a single detector and decoder block iterating on the various data or by several detector and decoder blocks being connected in a cascaded structure such as, e.g., a pipelined structure.

The complex modulated symbol $X_t$ spans all the possible (QAM or PSK) complex constellations S, or a properly selected subset thereof, denoted by C, with cardinality $S_C$.

Said symbol $X_t$ represents a reference transmit symbol, and its possible values represent candidate values to be used in the demodulation scheme.

For each of the $S_C$ possible values $X_t = \overline{X}$, as many corresponding sets of transmit sequences X, denoted with $U_t(\overline{X})$, are determined.

Each said set of sequences of transmitted symbols $U_t(\overline{X})$ is then obtained by grouping together (i.e. listing in sequences of T symbols each) the candidate value of the reference symbol, $X_t = \overline{X}$, and at least one further set of estimated sequences of the remaining (i.e. other than the candidates) transmitted symbols.

How to estimate such sequences is detailed in the exemplary embodiments.

It should be remarked that in order to include all possible X one should have:

$$U_t = \left\{ \bigcup_{\forall \overline{X} \in s} U_t(\overline{X}) \right\}$$

where $U_t(\overline{X}) = \{X : X_t = \overline{X}\}$. A basic property of an embodiment of the invention instead is to build sets of sequences $U_t$ such that they maintain a low cardinality, at the same time without impairing significantly the performance of the MAP detector. The final set St used to compute bit LLRs relative to $X_t$ is then built by choosing those elements in $U_t$ maximizing equation (4), i.e.:

$$S_t(\overline{X}) = \underset{X \in U_t(\overline{X})}{\mathrm{argmax}} D(x) \tag{8}$$

and $$S_t = \left\{ \bigcup_{\forall \overline{X} \in c} S_t(\overline{X}) \right\} \tag{9}$$

Calculating D(X) for $x \in U_t(\overline{X})$ means calculating a metric for each of said set of sequences of transmitted symbols $U_t(\overline{X})$. Similarly, solving equation (8) means selecting the sequence that maximizes the metric D(X), one for each candidate value ($S_t(\overline{X})$), and storing $S_t$ and D(X) for $x \equiv S_t(\overline{X})$ means storing the value of the maximum related metric and the associated selected sequence.

Moreover, calculating D(X) according to equation (4) in particular means calculating an a-posteriori probability metric, that also includes the steps of summing the opposite of an Euclidean distance term to the a-priori probability term for the selected candidate sequences X.

Actually, it is not computationally expensive and may offer significant performance improvements to consider also the sequences X belonging to the other sets $S_j$ with $j \neq t$ when computing bit LLRs relative to $X_t$. Mathematically this means that instead of $S_t(\overline{X})$ the modified set $S'_t(\overline{X})$ can be used instead:

$$S'_t(\overline{X}) = \left\{ \underset{X \in U_C(\overline{X}) \ OR \ X \in S_{j \neq t} : X_t = \overline{X}}{\mathrm{argmax}} D(\overline{X}), \forall \overline{X} \in c \right\} \tag{10}$$

and $$S'_t = \left\{ \bigcup_{\forall \overline{X} \in c} S'_t(\overline{X}) \right\} \tag{11}$$

In the following, it is understood that the embodiments equally apply to both $S_t$ as shown in equation (9) and $S'_t$ as shown in equation (11) though reference will be made to $S_t$ only to simplify the notation.

It should be remarked that a hard-decision estimate of the sequence X could then be obtained as:

$$\hat{X}^t = \arg\max_{\overline{X} \in c}\{D(S_t(\overline{X}))\} \quad (12)$$

Finally, an embodiment of the invention approximates equation (6) at every iteration using an updated version of the metric D(X), through:

$$L_{p,i} \cong \max_{X \in S_t^j(1)} D(X) - \max_{X \in S_t^j(0)} D(X) \quad (13)$$

where $S_t^j(1)$ and $S_t^j(0)$ are a set partitioning of $S_t$:

$$S_t^j(a) = \{x \in S_t : b_{M_C(t-1)+j}(x) = a\}, \ a = \{0,1\}, \quad (14)$$

and where t is the t-th antenna with $1 \leq t \leq T$, j the j-th bit in the modulated symbol with $1 \leq j \leq M_C$, and i denotes the i-th bit in the sequence output by the detector with $i = M_C(t-1)+j$.

Calculating equation (13) corresponds to calculating a-posteriori bit soft output information ($L_p$) for the selected sequences (X) from the set of metrics for the sequences D(X).

In the following, are described methods and apparatuses to choose $S_t$ with reduced complexity compared to the Max-Log-MAP detector and maintaining at the same time a near-optimal performance.

A first embodiment foresees suitable channel pre-processing to translate the system equation (1) into an equivalent one. The procedure is comprised of the distinct stages described in the following.

Channel Processing and Demodulation

In order to decouple the problem in turn for the different transmit antennas and efficiently determine $U_t$ it is useful to perform a channel matrix "triangularization" process, meaning that through proper processing it is factorized in two or more product matrices one of which is triangular. It is understood that different matrix processing may be applied to H. Examples include, but are not limited to, QR and Cholesky decomposition procedures [30].

Performing a Cholesky decomposition of complex channel state information matrix includes:
  forming a Gram matrix using the channel state information matrix;
  performing a Cholesky decomposition of the Gram matrix, and
  calculating the Moore-Penrose matrix inverse of the channel state information matrix, resulting in a pseudoinverse matrix.

This pseudoinverse matrix may then be used to process a complex vector of received sequences of digitally modulated symbols by multiplying the pseudoinverse matrix by the received vector.

In the following the alternative QR decomposition will be used, without loss of generality.

To simplify computations, a permutation matrix π(t) is introduced, which circularly shifts the elements of X (and consequently the order of the columns of H, too), such that the symbol $X_t$ under investigation moves to the last position:

$$\pi_t = [U_{t+1} \ldots U_T U_1 U_t]^T \quad (15)$$

where $U_t$ is a column vector of length T with all zeros but the t-th element equal to one. Then equation (1) can be rewritten as:

$$Y = H\pi_t^{-1}\pi_t X + N = H\pi_t^T \pi_t X + N \quad (16)$$

The arrangement entails processing T systems (16) characterized by T different dispositions of layers corresponding to the transmitted symbols, each layer being a reference layer in only one of the dispositions, and disposing the columns of the channel matrix accordingly prior to further processing.

Specifically, T different QR decompositions have to be performed, one for each $\pi_t$:

$$H\pi_t^T = Q_t R_t \quad (17)$$

where $Q_t$ is an orthonormal matrix of size R×T and $R_t$ is a T×T upper triangular matrix.

The ED metrics in equation (4) can be equivalently rewritten as:

$$D_{ED} = \frac{1}{N_0}\|Y - HX\|^2 \quad (18)$$

$$= \frac{1}{N_0}\|Y - Q_t R_t \Pi_t X\|^2$$

$$= \frac{1}{N_0}\|Q_t^H Y - R_t \Pi_t X\|^2$$

$$= \frac{1}{N_0}\|Y_t' - R_t X_t'\|^2$$

where $Y'_t = Q_t^H Y$ and $X'_t = \pi_t X$.

It should be noticed that no change in the noise statistics is introduced by the QR decomposition in the equivalent noise term $N'_t = Q_t^H N$.

Calculating equation (18) might be performed by calculating the Euclidean distance term between the received vector and the product of the channel state information matrix (H) and a possible transmit sequence (X).

It is useful to enumerate the rows of $R_t$ from top to bottom and create a correspondence with the different transmit antennas (or layers), ordered as in $x'_t$. Then the QAM symbol $X_t$ is located in the T-th position of $x'_t$ and corresponds to the last row of $R_t$, which acts as an equivalent triangular channel. The demodulation principle is to select the T-th layer as the reference one and determine for it a list of candidate constellation symbols. Then, for each sequence in the list, interference is cancelled from the received signal and the remaining symbol estimates are determined through interference nulling and cancelling, or spatial DFE. Exploiting the triangular structure of the channel, the estimation of the remaining T-1 complex symbols can be simply implemented through a slicing operation to the closest QAM (or PSK) constellation symbol, thus entailing a negligible complexity. This process can be called root conditioning. In order to compute reliable bit soft-output information the process needs to be repeated T times for T QR decompositions according to equations (15)-(18). More details can be found in [21].

As an example, in the following the process is described for T=2 transmit and R receive antennas. After the QR decomposition one has:

$$Y'_2 = \begin{bmatrix} Y_1 \\ Y_2 \end{bmatrix}, R_2 = \begin{bmatrix} r_{1,1} & r_{1,2} \\ 0 & r_{2,2} \end{bmatrix}, X'_2 = \begin{bmatrix} X_1 \\ X_2 \end{bmatrix} \quad (19)$$

Then from equation (4) and (18) follows:

$$D_{ED} = \frac{1}{N_0} \|Y_2' - R_2 X_2'\|^2 \quad (20)$$

$$= \frac{1}{N_0}(|Y_2 - r_{2,2}X_2|^2 + |Y_1 - r_{1,1}X_1 - r_{1,2}X_2|^2)$$

Under the hypothesis that $X_2 = \overline{X}$ has been transmitted, $X_1$ which minimizes the distance between Y and $H \cdot [X_1 \ X_2]^T$ can be found through thresholds, i.e., slicing to the closest constellation element (denoted in formulas through the "round" function):

$$\hat{X}_1(\overline{X})_{X:(X_2=\overline{X})} = \arg\min \|Y_2' - R_2 X_2'\|^2 \quad (21)$$

$$= \arg\min_{X_1} |Y_1 - r_{1,1}X_1 - r_{1,2}\overline{X}|^2$$

$$= \underset{X_1 \in c}{\text{round}}\left(\frac{Y_1 - r_{1,2}\overline{X}}{r_{1,1}}\right)$$

If $L_{a,i}=0$, with $i=1,\ldots,TM_C$, the hard-output ML sequence can then be determined as $$\{\hat{X}_1, \hat{X}_2\} = \underset{X_2 \in c}{\arg\max}[-D_{ED}(\hat{X}_1(X_2), X_2)] \quad (22)$$

where S spans the whole set of complex constellation symbols. Thus the complexity of the ML detector is reduced from $2^{2M_C}$ to $2^{M_C}$ sequences to be searched. The same demodulation principle can be used to compute optimal max-log LLRs for the bit corresponding to symbol $X_2$ as:

$$L_{p,i} = \max_{X \in S_2^j(1)}[-D_{ED}(\hat{X}_1(X_2), X_2)] - \max_{X \in S_2^j(0)}[-D_{ED}(\hat{X}_1(X_2), X_2)] \quad (23)$$

where $1 \leq j \leq M_C$, $i=M_C+j$ denotes the i-th bit in the sequence output by the detector, and $S_2^j(1)$, $S_2^j(0)$ are a set partitioning of $S_2$:

$$S_2^j(a) = \{X \in S_2 : b_{M_C+j} = a\}, \ a = \{0,1\} \quad (24)$$

Similarly, an equivalent system can be derived:

$$Y_1' = \begin{bmatrix} Y_1 \\ Y_2 \end{bmatrix}, R_1 = \begin{bmatrix} r_{1,1}' & r_{1,2}' \\ 0 & r_{2,2}' \end{bmatrix}, X_1' = \begin{bmatrix} X_1 \\ X_2 \end{bmatrix} \quad (25)$$

$$D_{ED} = \frac{1}{N_0}\|Y_1' - R_1 X_1'\|^2 \quad (26)$$

$$= \frac{1}{N_0}(|Y_2' - r_{2,2}'X_1|^2 + |Y_1' - r_{1,1}'X_2 - r_{1,2}'X_1|^2)$$

and $$\hat{X}_2(\overline{X})_{X:(X_1=\overline{X})} = \arg\min \|Y_1' - R_1 X_1'\|^2 \quad (27)$$

$$= \arg\min_{X_2} |Y_1 - r_{1,1}'X_2 - r_{1,2}'\overline{X}|^2$$

$$= \underset{X_2 \in c}{\text{round}}\left(\frac{Y_1 - r_{1,2}'\overline{X}}{r_{1,1}'}\right)$$

Finally, max-log LLRs for the bit corresponding to symbol $X_1$ can be computed as:

$$L_{p,i} = \max_{X \in S_1^j(1)}[-D_{ED}(\hat{X}_2(X_1), X_1)] - \max_{X \in S_1^j(0)}[-D_{ED}(\hat{X}_2(X_1), X_1)] \quad (28)$$

where $1 \leq j \leq M_C$.

If more T>2 antennas are considered the hard-output sequence and the (max-log) LLRs are not optimal because of error propagation through the layers from T-1 to 1.

The Distance and A-Priori Criteria

In the following, two different criteria to select the elements of $U_t(\overline{X})$ are described.

It is understood that equivalent approaches can be used, which is representative of an approach adapted to be indicated as a Turbo-Layered Orthogonal Lattice Detector (briefly T-LORD).

How to choose the elements $X_t$ to be included into each set $U_t(\overline{X})$ will now be discussed.

A Max-Log-Map detector according to equation (6) is able to determine those two symbols (with a certain bit equal to one or zero) which maximize the metric D(X) by considering all possible transmitted sequences, i.e., at the expense of a prohibitive complexity. In this first embodiment, the T-LORD detector instead computes equation (13), i.e., selects two subsets of sequences $S_t^j(1)$, $S_t^j(0)$ as shown in equation (14) by separately maximizing—$D_{ED}$ and $D_a$:

$$X^D = \underset{X}{\arg\max}(-D_{ED}) = \underset{X}{\arg\min}\|Y - HX\|^2 = \underset{X}{\arg\min}D_{ED} \quad (29)$$

$$X^A = \underset{X}{\arg\max}\sum_{i=1}^{T \cdot M_C} b_i(X)\frac{L_{a,i}}{2} \quad (30)$$

where $b_i = \{\pm 1\}$ and $L_{a,i}$ represent the a-priori LLRs for the i-th bit of the transmit sequence X.

Considering $x^D$ means selecting as one candidate sequence of the possible transmitted symbols the transmitted sequences with the smallest value of the Euclidean distance term and considering $x_A$ means selecting as further candidate sequence of the remaining transmit symbols the transmit sequence with the largest a-priori information ($L_a$) of the symbol sequence.

It should be noted that equation (29) is computed only once while equation (30) is updated for every iteration, as the a-priori LLRs $L_{a,i}$ change from one iteration to the other. In other words, this technique separately searches for the closest and the most a priori likely transmitted sequences, and approximates the joint maximization of equation (4) through separate maximization of ($-D_{ED}$) and $D_a$. Using the terminology introduced in equation [22] for a different procedure, similarly equations (29) and (39) obey the distance and a priori criteria respectively.

As a further step, the arrangement described herein also involves a method to reduce the complexity of equation (29) and (30) by decoupling the search of the candidate sequences X for the different transmit antennas. As mentioned above, the complex modulated symbol $X_t$ spans all the possible (QAM or PSK) constellation symbols, or a properly selected subset C. For each $X_t=\overline{X}$ value corresponding groups of transmit sequences X, denoted with $U_t(\overline{X})$, are determined considering both $X^D$ and $X^A$ i.e.:

$$U_t(\overline{X})=\{x^D(X_t=\overline{X}), X^A(X_t=\overline{X})\} \tag{31}$$

The technique drastically reduces the cardinality of the max-log-MAP detector by overall considering T sets $U_t$, with t=1, . . . , T. If the cardinality of $U_t(X)$ is kept low and independent of T, the complexity of the approximated max-log-MAP detector is linear versus T, instead of the exponential dependence $2^{TM_C}$.

The sequence $X^D$ from equation (29) can be estimated according to the guidelines described in the former sections and in [21], namely performing a channel triangularization (for example a QR decomposition) and root conditioning as described by equations (18), (21) and (27). It is noted that [21] does not foresee processing a-priori information differently from the disclosed technique, which represents a very significant improvement of it.

From equation (18) follows:

$$D_{ED} = \frac{1}{N_0}\|Y'_t - R_t X'_t\|^2 \tag{32}$$

$$= \frac{1}{N_0}\left(\left|Y_1^t - r_{1,1}^t X_1^t - \sum_{k=2}^{T} r_{1,k}^t X_k^t\right|^2 + \left|Y_2^t - r_{2,2}^t X_2^t - \sum_{k=3}^{T} r_{2,k}^t X_k^t\right|^2 + \ldots + |Y_T^t - r_{T,T}^t X_T^t|^2\right)$$

According to equation (32), for every $X_t=\overline{X}$ the conditional decoded values of $X_1^t, \ldots X_{T-1}^t$, are determined recursively according to a spatial DFE principle as:

$$\hat{X}_{T-1}^{tD}(\overline{X}) = \text{round}\left(\frac{Y_{T-1}^t - r_{T-1,T}^t \overline{X}}{r_{T-1,T-1}^t}\right) \tag{33}$$

$$\vdots$$

$$\hat{X}_1^{tD}(\overline{X}) = \text{round}\left(\frac{Y_1^t - \sum_{k=2}^{T-1} r_{1,k}^t \hat{X}_k^{tD} - r_{1,T}^t \overline{X}}{r_{1,1}^t}\right)$$

Denoting these T−1 conditional decisions as $\hat{x}_{\{1,T-1\}}^{tD}(\overline{X})$, the resulting estimated sequence is:

$$\hat{x}^{tD}(\overline{X})=\{\hat{x}_{\{1,T-1\}}^{tD}(\overline{X}), \overline{X}\} \tag{34}$$

and can be used as the estimate sequence of $x^D(X_t=\overline{X})$.

It is noted that, for each candidate value of the reference transmit symbol (a hard-decision estimate of $x^D$), selecting as candidate sequence of the transmit symbols the transmit sequence with the smallest value of said Euclidean distance term ($D_{ED}$) can be estimated through spatial decision feedback equalization of the remaining transmit symbols ($\hat{x}_{\{1,T-1\}}^{tD}(\overline{X})$), computed starting from each candidate value of the reference transmitted symbol. The sequence $\hat{x}^{tD}(\overline{X})$ is then obtained by grouping together (i.e. listing in a sequence of T symbols) the candidate value of the reference symbol, $X_t=\overline{X}$, and the estimated sequence of the remaining transmitted symbols ($\hat{x}_{\{1,T-1\}}^{tD}(\overline{X})$).

Specifically, a hard-decision estimate of $x^D$ can be obtained as:

$$\hat{x}^{tD} = \underset{\overline{X}\in C}{\text{argmin}}\{D_{ED}(\hat{x}^{tD}(\overline{X}))\} \tag{35}$$

In general $\hat{x}^D \neq x^D$ (i.e. $\hat{x}^{tD}$ is an estimate of $x^D$) even if $X_t$ spans all the possible constellation symbols, because the procedure suffers error propagations from the intermediate layers (in general, all except the first and last one). So, for T>2, and also in the case of no a priori information, some performance degradation with respect to the ML detector may occur.

It is noted that (32)-(33) may be computed only once and used for several iterations.

Also, modifications of the present embodiment where the set C is changed from one iteration to the other (typically, reduced according to criteria based, e.g., on the ED metric, or the a-priori information, or both) are contemplated.

The a-priori criterion (30) also has a practical implementation, i.e., the most likely a-priori sequence $X^A$ can be easily computed by first determining the relative bits based on the sign of the incoming LLRs $L_{a,i}$, (and then remapping the bit sequence) as:

$$x^{tA}(\overline{X})=x:(X_t=\overline{X}) \text{ AND}$$

$$\{b_{(i-1)M_C+j}(x)=\text{sign}(L_{a,(i-1)M_C+j})\forall i\neq t, j=1,\ldots,M_C\} \tag{36}$$

Finally, the desired set of sequences is given by:

$$U_t(\overline{X})=\{\hat{x}^{tD}(X_t=\overline{X}), x^{tA}(X_t=\overline{X})\} \tag{37}$$

The set of sequences $U_t(\overline{X})$ represents a set of sequences of the transmitted symbols, obtained by grouping together (i.e. listing in sequences of T symbols each) the candidate value of the reference symbol, $X_t=\overline{X}$, and one estimated further set of sequences of the remaining (i.e. other than the candidate) transmitted symbols.

The two above simplified criteria lead to an overall number of considered sequences per iteration equal to $2S_CT \leq 2^{M_C+1}T$.

Smaller LLR Flipping Criterion

In this section a method to improve the performance of the previously described T-LORD detector is suggested. It proposes a different way to compute $S_+$. $U_t(\overline{X})$, as defined in equation (31), and only includes the closest and most probable sequence, given a certain root $\overline{X}$. A way to improve the performance of the T-LORD detector is increasing the number of sequences in $U_t(\overline{X})$. This can be done acting on the a-priori metric, taking into account, i.e., also the second most likely x besides equation (30):

$$x^F = \underset{x\backslash x^A}{\text{argmax}} \sum_{i=1}^{T\cdot M_C} b_i(x)\frac{L_{a,i}}{2} \tag{38}$$

Considering $x^F$ means selecting as a further candidate sequence of the remaining transmit symbols the transmit sequence with the second largest a-priori information ($L_a$) of the symbol sequence.

It can be easily shown that the solution of (38) corresponds to (36) with the least reliable bit (i.e., bit having the minimum $|L_{a,i}|$) flipped.

The following equation shows the a priori criterion with the weakest LLR flipped, jointly applied to each layer, with the exception of the root:

$$X^{tF}(\overline{X}) = X:(X_t = \overline{X}) \text{ AND} \quad (39)$$

$$\left( b_{(i-1)M_c+j}(x) = \begin{cases} \text{sign}(L_{a,(i-1)M_c+j}) & L_{a,(i-1)M_c+j} \neq \min_{k \neq t}|L_{a,(k-1)M_c+j}| \\ \text{sign}(-L_{a,(i-1)M_c+j}) & L_{a,(i-1)M_c+j} = \min_{k \neq t}|L_{a,(k-1)M_c+j}| \end{cases} \right.$$
$$\forall i \neq t, j = 1, \ldots, M_c$$

Then, the desired set of sequences will be given by:

$$U_t(\overline{X}) = \{\hat{x}^{tD}(\overline{X}), x^{tA}(\overline{X}), x^{tF}(\overline{X})\} \quad (40)$$

The embodiment described in the foregoing foresees computing $U_t$ by approximating the joint maximization of $(-D_{ED})$ and $D_a$ in equation (4) through a separate maximization of the two metric terms. The transmit sequences X to be considered for the separate maximization are determined by applying a same "criterion" to all the layers. In particular, the "distance criterion" (32)-(33) leads to approximating arg max$(-D_{ED}(x))$ ignoring $D_a$, and vice versa the "a-priori criterion" computes arg max $D_a(x)$ ignoring $D_{ED}$.

As an alternative embodiment, the different criteria formerly mentioned can also be applied on a layer by layer basis. This way, the spatial DFE as in [21] is modified based on the possible correction term represented by the a-priori information available for the symbol under consideration at a given layer. In formulas, the idea is to specialize equation (4) for the different layers from T-1 to 1 after each channel triangularization has been computed; specifically, at every iteration, for the t-th process the "partial" a-posteriori probability metric for layer j can be written as:

$$D^t_{p,j}(\overline{X}^t_j) = -\frac{1}{N_0}\left|Y^t_j - r^t_{j,j}\overline{X}^t_j - \sum_{k=j+1}^{T} r^t_{j,k}X^t_k\right|^2 + \sum_{j=1}^{M_c} b_j(\overline{X}^t_j)\frac{L_{a,j}(X^t_j)}{2} \quad (41)$$

where $L_{a,j}(X^t_j)$ are the LLRs of the bits belonging to the symbol $X^t_j$ output by the decoder, $X^t_j = \overline{X}^t_j$, and $b_j(\overline{X}^t_j)$ are the bits obtained by demapping $\overline{X}^t_j$ expressed in antipodal notation.

Specifically, the partial a-posteriori probability metric in equation (41) is obtained by summing the opposite of a partial Euclidean distance term to an a-priori probability term for the selected candidate symbols.

The partial Euclidean distance term associated to the transmit symbol to be estimated is given for the generic layer j by:

$$\frac{1}{N_0}\left|Y^t_j - r^t_{j,j}\overline{X}^t_j - \sum_{k=j+1}^{T} r^t_{j,k}X^t_k\right|^2$$

and comprises computing the square magnitude of the difference between a processed received vector scalar term, and a summation of products, each product involving a coefficient of a triangularized channel state information matrix and a corresponding transmit symbol estimate.

Then, for every $X^t_T = \overline{X}$ the conditional decoded values of $X^t_1, \ldots X^t_{T-1}$ are determined recursively as:

$$\begin{cases} \hat{X}^{tD}_{T-1}(\overline{X}) = \text{round}\left(\frac{Y^t_{T-1} - r^t_{T-1,T}\overline{X}}{r^t_{T-1,T-1}}\right), \\ \hat{X}^{tA}_{T-1} = \underset{X^t_{T-1}}{\text{argmax}} \sum_{i=1}^{M_c} b_i(X^t_{T-1})\frac{L_{a,i}(X^t_{T-1})}{2} \end{cases} \quad (42)$$

$$\hat{X}^t_{T-1}(\overline{X}) = \underset{\overline{X}^t_{T-1} \in \{\hat{X}^{tD}_{T-1}, \hat{X}^{tA}_{T-1}\}}{\text{argmax}} D^t_{p,T-1}(\overline{X}^t_{T-1})$$

$$\begin{cases} \hat{X}^{tD}_{T-2}(\overline{X}) = \text{round}\left(\frac{Y^t_{T-2} - r^t_{T-2,T-1}\hat{X}^t_{T-1} - r^t_{T-2,T}\overline{X}}{r^t_{T-2,T-2}}\right), \\ \hat{X}^{tA}_{T-2} = \underset{X^t_{T-2}}{\text{argmax}} \sum_{i=1}^{M_c} b_i(X^t_{T-2})\frac{L_{a,i}(X^t_{T-2})}{2} \end{cases}$$

$$\hat{X}^t_{T-2}(\overline{X}) = \underset{\overline{X}^t_{T-2} \in \{\hat{X}^{tD}_{T-2}, \hat{X}^{tA}_{T-2}\}}{\text{argmax}} D^t_{p,T-2}(\overline{X}^t_{T-2})$$

$$\vdots$$

$$\begin{cases} \hat{X}^{tD}_1(\overline{X}) = \text{round}\left(\frac{Y^t_1 - \sum_{k=2}^{T-1} r^t_{1,k}\hat{X}^t_k - r^t_{1,T}\overline{X}}{r^t_{1,1}}\right), \\ \hat{X}^{tA}_1 = \underset{X^t_1}{\text{argmax}} \sum_{i=1}^{M_c} b_i(X^t_1)\frac{L_{a,i}(X^t_1)}{2} \end{cases}$$

$$\hat{X}^t_1(\overline{X}) = \underset{\overline{X}^t_1 \in \{\hat{X}^{tD}_1, \hat{X}^{tA}_1\}}{\text{argmax}} D^t_{p,1}(\overline{X}^t_1)$$

It is noted that estimating for each candidate value $(X^t_T = \overline{X})$ a sequence of the remaining (i.e. other than the candidates) transmitted symbols $(X^t_1, \ldots X^t_{T-1})$ includes the steps of:
  estimating the remaining transmit symbols in turn one at a time, in a successive detection fashion;
  calculating the partial Euclidean distance term associated to the transmit symbol to be estimated;
  selecting as one candidate transmitted symbol the transmitted symbol with the smallest value of said partial Euclidean distance term—denoted as $\hat{X}^{t\,D}_k(\overline{X})$ for the k-th layer—which can be simply computed through slicing to the closest constellation element, denoted by the round function in (42);
  selecting as further candidate transmitted symbol the transmit symbol with the largest a-priori information (La) of said symbol (denoted as $\hat{X}^{t\,A}_k$ for the k-th layer);
  calculating the partial a-posteriori probability metric (41) associated to the transmit symbol to be estimated;
  selecting as estimated transmit symbol (denoted as $\hat{X}^t_k(\overline{X})$ for the k-th layer) the symbol that maximizes said partial a-posteriori probability metric.

It is noted that at a first stage of detection no a-priori information is available, i.e. equi-probable symbols are considered and (41)-(42) coincide with equations (32) and (33). Starting from the first iteration, $L_{a,i} \neq 0$ and (41)-(42) need to be computed and updated at every iteration.

Similarly to equation (36):

$$\hat{X}^{tA}_j = X:\{b_i(X) = \text{sign}(L_{a,i}) \forall i = 1, \ldots, M_C\} \quad (43)$$

Denoting the T-1 conditional decisions as $\hat{x}_{\{1,T-1\}}{}^t(\overline{X})$, one has:

$$\hat{X}_{\{1,T\}}{}^t(\overline{X}) = \{\hat{x}_{\{1,T-1\}}{}^t(\overline{X}), \overline{X}\}$$

$$S_t(\overline{X}) = U_t(\overline{X}) = \hat{x}_{\{1,T\}}{}^t(\overline{X}) \qquad (44)$$

Then, a-posteriori LLRs can be computed using equations (9)-(14).

The two above simplified criteria lead to an overall number of considered sequences per iteration equal to $S_C T \leq 2^{M_c 1} T$, while the complexity of computing (44) is equivalent to that of using (37) in terms of number of real multipliers (RMs). Complexity-wise, the main difference lies in a higher number of comparisons as witnessed by (42). Considering this embodiment, however, is motivated by a significant performance benefit in some configurations, in particular when T>2.

In this case an additional criterion can be applied in order to enhance the performance of the invention at the expense of enlarging the set of possible candidates at each layer level. For instance this can be obtained by generalizing the "smaller LLR flipping criterion" presented previously, specifically for the j-th layer:

$$\hat{X}_j^{tF} = \underset{X_j^t \backslash \hat{X}_j^{tA}}{\mathrm{argmax}} \sum_{i=1}^{M_c} b_i(X_j^t) \frac{L_{a,i}(X_j^t)}{2} \qquad (45)$$

Similarly to equation (39):

$$\hat{X}_j^{tF} = X : \left( b_i(X) = \begin{cases} \mathrm{sign}(L_{a,i}) & L_{a,i} \neq \underset{k}{\min}|L_{a,k}| \\ \mathrm{sign}(-L_{a,i}) & L_{a,i} = \underset{k}{\min}|L_{a,k}| \end{cases} \right. \qquad (46)$$
$$\forall i = 1, \ldots, M_c \right)$$

Then, the estimate $\hat{X}_j^t$ can be determined as a function of $X_T^t = \overline{X}$ generalizing equation (42) as:

$$\hat{X}_j^t(\overline{X}) = \underset{\overline{x}_j^t \in \{\hat{X}_j^{tD}, \hat{X}_j^{tA}, \hat{X}_j^{tF}\}}{\mathrm{argmax}} D_{p,j}^t(\overline{X}_j^t) \qquad (47)$$

Considering also $\hat{X}_k^{tF}$ as a candidate transmitted symbol for the k-th layer in the successive detection process (42) means selecting as a further candidate transmitted symbol, the transmitted symbol with the second largest a-priori information ($L_a$) of the symbol.

Modifications of the present embodiment where the set C is changed from one iteration to the other (typically, reduced according to criteria based, e.g., on the ED metric, or the a-priori information, or both) are contemplated.

In other words, an embodiment of the invention also includes any of the previous preferred embodiments, wherein identifying a set of values for at least one reference transmitted symbol, the possible values representing candidate values, comprises determining a set of possible values whose cardinality changes as a function of the considered processing iteration, and typically is reduced for an increasing number of iterations.

A possible embodiment includes, but is not limited to, the following formulation. $\hat{X}_{T,k}^t$ is denoted as the estimate of the symbol $X_T^t = X_t$ computed at the k-th iteration, which can be obtained from equation (35). At the first stage of the detection (k=0) $\hat{x}_{T,0}^t \equiv \hat{x}_T^{tD}$ is assumed. This might be obtained for instance also from equation (35) (which is a particular case of equation (12)). Then, from k=1 onwards, when $L_{a,i} \neq 0$ are available from the decoder, it is possible to determine just one candidate symbol $\hat{X}_{T,k}^t$ to pass to the upper layers according to:

$$\begin{cases} \hat{X}_{T,k}^{tD} = \hat{X}_{T,0}^{tD}, \hat{X}_{T,k}^{tA} = \underset{X_T^t}{\mathrm{argmax}} \sum_{i=1}^{M_c} b_i(X_T^t) \frac{L_{a,i,k}(X_T^t)}{2} \\ \hat{X}_{T,k}^t = \underset{\overline{x}_T^t \in \{\hat{X}_{T,k}^{tD}, \hat{X}_{T,k}^{tA}\}}{\mathrm{argmax}} D_{p,t}^t(\overline{X}_T^t) \end{cases} \qquad (48)$$

where $L_{a,i,k}$ are the a-priori LLRs for the i-th bit in the sequence and iteration k.

Then, the remaining symbols may be estimated according to (42) where just one candidate symbol $\overline{X} \equiv \hat{X}_{T,k}^t$ is considered instead of all $\hat{X} \in C$.

Alternatively, at each iteration k the estimate $\hat{X}_T^t$ result of the iteration k-1 may be used as one of the two starting candidates (the other is still given by the maximization of the a-priori LLRs as usual):

$$\begin{cases} \hat{X}_{T,k}^{tp} = \hat{X}_{T,k-1}^t, \hat{X}_{T,k}^{tA} = \underset{X_T^t}{\mathrm{argmax}} \sum_{i=1}^{M_c} b_i(X_T^t) \frac{L_{a,i,k}(X_T^t)}{2} \\ \hat{X}_{T,k}^t = \underset{\overline{x}_T^t \in \{\hat{X}_{T,k}^{tp}, \hat{X}_{T,k}^{tA}\}}{\mathrm{argmax}} D_{p,T}^t(\overline{X}_T^t) \end{cases} \qquad (49)$$

where $\hat{x}_{T,k}^{tp}$ stands for the first "partial" estimate and replaces $\hat{x}_{T,k}^{tD}$ in (48).

Both solutions (48) and (49) yield a clear complexity advantage as only one straightforward sequence is considered at each iteration for $k \geq 1$. As in both cases using such a small number of sequences may not be enough to update the LLRs relative to the whole transmit sequence for iteration k with $k \geq 1$, a possible work-around is to update anyway the LLRs relative to the bits not part of the newly selected hard estimate $\hat{x}_k^t$, using the updated a-priori information $L_{a,i,k}$ coming from the outer soft decoder.

The analysis developed previously in describing the first embodiment considered in the foregoing determines $U_t(\overline{X})$ by applying the same criteria, i.e., either the distance or the a-priori criterion, at a layer to all the layers. As a consequence, the estimated sequence St may not be optimal, as it may suffer from error propagation. To mitigate this effect, $U_t(\overline{X})$ may include those symbols chosen with different criteria over different layers. For instance, in case of T=3 the following possibilities exist for t=2:

$$U_2(\overline{X}) = \{x_{\{1,3\}}{}^{2D}(\overline{X}), x_{\{1,3\}}{}^{2A}(\overline{X}), x_{\{1\},\{3\}}{}^{2DA}(\overline{X}), x_{\{3\},\{1\}}{}^{2DA}(\overline{X})\} \qquad (50)$$

The last two elements in (50) explicitly show the list of those layers processed following the respective criterion in the apex: this is just an example of the most general hyper-symbol $x_{S_D, S_A, S_F}{}^{t\ D,A,F}(\overline{X})$, where $S^D$, $S^A$, $S^F$ denote the indexes of the layers subject to the distance, a-priori, LLR-flipping criteria, respectively. Any possible combination of the above presented criteria is possible.

The choice of branching over each intermediate layer causes a complexity growth; i.e., if all three criteria are considered at each layer level, then $3^{T-1} S_C T$ sequences per iteration are to be considered instead of the $2 S_C T$ obtained adopting separately only the a priori and distance criteria, as proposed for the basic version of the technique (i.e., the first embodiment).

In further possible embodiments, the "T-LORD" arrangement described herein may also be formulated in the real domain if a suitable "lattice" (i.e., real domain) representation, is derived prior to the stages formerly described.

Specifically, another embodiment is to adopt a real representation of the MIMO system equation (1) where the in-phase (I) and quadrature-phase (Q) components of the complex quantities are ordered as:

$$x = [X_{1,I} X_{1,Q} \ldots X_{T,I} X_{T,Q}]^T = [x_1 x_2 \ldots x_{2T}]^T$$

$$y = [Y_{1,I} Y_{1,Q} \ldots Y_{R,I} Y_{R,Q}]^T = [y_1 y_2 \ldots y_{2R}]^T$$

$$n = [N_{1,I} N_{1,Q} \ldots N_{R,I} N_{R,Q}]^T$$

$$y = hx + n = [h_1 \ldots h_{2T}] x + n \quad (51)$$

h is a real channel matrix of size 2R×2T where the channel columns then have the form:

$$h_{2k-1} = [Re(H_{1,k}) Im(H_{1,k}) \ldots Re(H_{R,k}) Im(H_{R,k})]^T$$

$$h_{2k} = [-Im(H_{1,k}) Re(H_{1,k}) \ldots -Im(H_{R,k}) Re(H_{R,k})]^T \quad (52)$$

where the elements $H_{j,k}$ are entries of the (complex) channel matrix H.

As a consequence of this formulation, the pairs $h_{2k-1}^T$, $h_{2k}$ are already orthogonal, i.e., $h_{2k-1}^T h_{2k} = 0$, and this property may prove to be very effective for the procedure. Other useful relations are:

$$\|h_{2k-1}\|^2 = \|h_{2k}\|^2$$

$$h_{2k-1}^T h_{2j-1} = h_{2k}^T h_{2j}, h_{2k-1}^T h_{2j} = -h_{2k}^T h_{2j-1} \quad (53)$$

where k, j = {1, ..., T} and k≠j.

Using this formulation, all formerly presented embodiments may be translated into an equivalent real-domain representation. Namely, the first three embodiments discussed in the foregoing may be implemented in the real domain according to the three further embodiments discussed in the following, where the equations for the channel processing are given while the remainder of the real-domain formulation is omitted for brevity.

Channel Processing and Demodulation

From (51)-(53) the I and Q of the complex symbols may be demodulated independently thus allowing the same degree of parallelism of the complex domain formulation, as clear from the following. As mentioned, the idea to simplify computations is to focus on one symbol, the $X_t = (X_{t,I}, X_{t,Q}) = (x_{t-1}, x_t)$ symbol, transmitted by the t-th antenna, and consider for the I and Q all the possible PAM values, or properly selected subsets, denoted by $m_I$ and $m_Q$ for $X_{t,I}, X_{t,Q}$ respectively, with respective cardinality $S_{m_I}, S_{m_Q}$. For each of the $S_{m_I} \cdot S_{m_Q}$ possible cases $(\bar{x}_{t-1}, \bar{x}_t)$, as many corresponding groups of transmit sequences X, denoted with $U_t(\bar{x}_{t-1}, \bar{x}_t)$, are determined. The final set $S_t$ is then built by choosing those elements in $U_t$ maximizing equation (4):

$$S_t = \left\{ \underset{x \in U_t(\bar{x}_{t-1}, \bar{x}_t)}{\operatorname{argmax}} D(x), \forall \bar{x}_{t-1} \in m_I, \forall \bar{x}_t \in m_Q \right\} \quad (54)$$

In order to decouple the problem in turn for the different transmit antennas, and for the I and Q components belonging to the complex symbol transmitted by an antenna, and efficiently determine $U_t$, it is useful to perform a channel matrix "triangularization" process, meaning that through proper processing it is factorized in two or more product matrices one of which is triangular. It is understood that different matrix processing may be applied to H. Examples include, but are not limited to, QR and Cholesky decomposition procedures [30]. In the following QR will be used, without loss of generality.

To simplify computations, one may introduce the permutation matrix $\pi_t$, which circularly shifts the elements of x (and consequently the order of the columns of x, too), such that the pair $(x_{t-1}, x_t)$ under investigation moves to the last two positions:

$$\pi_t = [u_{2(t-1)-1} u_{2(t-1)} \ldots u_1 u_2 \ldots u_{2t-1} u_{2t}]^T \quad (55)$$

where $u_i$ is a column vector of length 2T with all zeros but the i-th element equal to one.

Consequently, equation (51) can be rewritten as:

$$y = h\pi_t^{-1} \pi_t x + n = h\pi_t^T \pi_t x + n \quad (56)$$

T different QR decompositions are performed, one for each $\pi_t$:

$$h\pi_t^T = q_t r_t \quad (57)$$

where $q_t$ is an orthonormal matrix of size 2R×2T and $r_t$ is a 2T×2T upper triangular matrix having the structure:

$$r_t = \begin{bmatrix} r_{1,1} & 0 & \ldots & r_{1,2(t-1)-1} & r_{1,2(t-1)} & r_{1,2t-1} & r_{1,2t} \\ 0 & r_{2,2} & \ldots & r_{2,2(t-1)-1} & r_{2,2(t-1)} & r_{2,2t-1} & r_{2,2t} \\ \vdots & \vdots & \ddots & \vdots & \vdots & \vdots & \vdots \\ 0 & 0 & \ldots & r_{2(t-1)-1,2(t-1)-1} & 0 & r_{2(t-1)-1,2t-1} & r_{2(t-1)-1,2t} \\ 0 & 0 & \ldots & 0 & r_{2(t-1),2(t-1)} & r_{2(t-1),2t-1} & r_{2(t-1),2t} \\ 0 & 0 & \ldots & 0 & 0 & r_{2t-1,2t-1} & 0 \\ 0 & 0 & \ldots & 0 & 0 & 0 & r_{2t,2t} \end{bmatrix} \quad (58)$$

Interestingly, the entries at position (2k−1, 2k) are zeros. This is a consequence of equations (51)-(53) and specifically of $h_{2k-1}^T h_{2k} = 0$, and it is of basic importance to be able to independently (i.e., in parallel) treat the I and Q of complex modulated symbols $X_k$.

The ED metrics of equation (4) may be rewritten as:

$$D_{ED} = -\frac{1}{N_0} \|y - hx\|^2 \quad (59)$$

$$= -\frac{1}{N_0} \|y - q_t r_t \pi_t x\|^2$$

$$= -\frac{1}{N_0} \|q_t^T y - r_t \pi_t x\|^2$$

$$= -\frac{1}{N_0} \|y'_t - r_t x'_t\|^2$$

where $y'_t = q_t^T y$ and $x'_t = \pi_t x$.

It is useful to enumerate the rows of $r_t$ from top to bottom and create a correspondence with the different I and Q of the different layers, ordered as in $x'_t$. This way $(x_{t-1}, x_t)$ are located in the last two positions of $x'_t$ and correspond to the last rows of $r_t$, which acts as an equivalent triangular channel. The demodulation principle is to select the T-th layer as the reference one and determine for it a list of candidate/and Q values. Then, for each sequence in the list, interference is cancelled from the received signal and the remaining PAM estimates are determined through interference nulling and cancelling, or spatial DFE. Exploiting the triangular structure of the channel, the estimation of the remaining 2T-2 real components of the symbols can be simply implemented through a slicing operation to the closest PAM coordinate, thus entailing a negligible complexity. More details on this demodulation principle, can be found in [21]. It is noted that [21] does not foresee processing a-priori information differently from the present technique, which represents a very significant improvement of it.

Using (51)-(59) all the formulations previously described in the complex domain can be generalized in a straightforward way and thus represent other embodiments for the present invention.

Figure 6A:
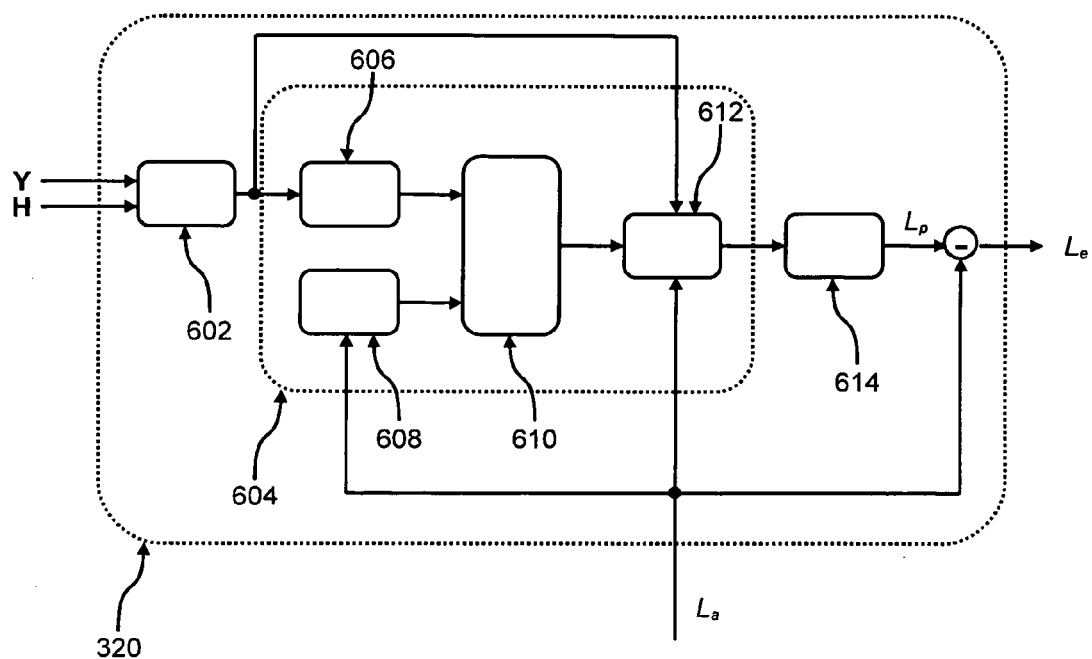
FIGS. 6A and 6B illustrate example methods for detecting communications from multiple sources in accordance with this disclosure.
Figure 6B:
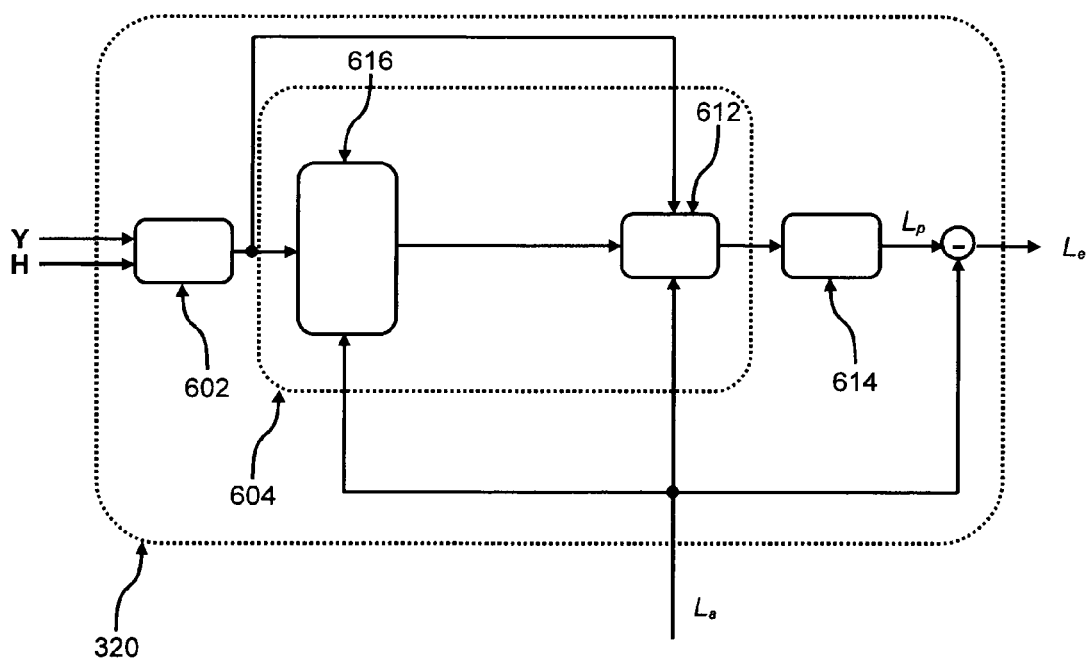

FIG. 6A and FIG. 6B are flowcharts illustrating the means or steps for performing the specified functions according to one or more embodiments of the present invention. They both refer to a single iteration process.

Specifically, FIG. 6A illustrates, according to an embodiment, the means or steps performed by a receiver comprising an iterative detection and decoding of multiple antenna communications that detects sequences of digitally modulated symbols transmitted by multiple sources, wherein the detector generates extrinsic bit soft output information processing the a-priori information provided by a soft-output decoder. The detector approximates the computation of the maximum a-posteriori transmitted sequence by determining two sets of candidates, processed by two distinguishable units, or processors. One unit receives as input the processed received sequence and processed channel state information matrix. The other unit processes as input the a-priori bit soft information.

FIG. 6B illustrates, according to an embodiment, the means or steps performed by a receiver comprising an iterative detection and decoding of multiple antenna communications that detects sequences of digitally modulated symbols transmitted by multiple sources, wherein the detector generates extrinsic bit soft output information processing the a-priori information provided by a soft-output decoder. The detector approximates the computation of the maximum a-posteriori transmitted sequence by determining a set of candidates obtained by properly processing the received sequence, the channel state information matrix, the a-priori bit soft information.

The arrangement described herein, according to an embodiment, achieves near-optimal (i.e., near MAP) performance for a high number of transmit antennas, with a much lower complexity as compared to a MAP detection and decoding method and apparatus. Moreover, the arrangement described herein is suitable for highly parallel hardware architectures.

Referring to FIG. 6A, block 320 includes all the blocks that repeat their processing for a number of times equal to the number of transmit antennas, each time changing some parameter, or reading different memory stored values, related to the transmit antenna index.

Block 602 represents, according to an embodiment, the means for or step of pre-processing the system equation (1) and particularly of the channel matrix and the received vector, in order to factorize the channel matrix into a product of matrices one of which is a triangular matrix. As an illustrative example, the channel matrix may be decomposed into the product of an orthogonal matrix and a triangular matrix. The process is repeated for a number of times equal to the number of transmit antennas, where each time the column of the input the channel matrix are disposed according to a different order.

Block 604 includes, according to an embodiment, all the blocks that repeat their processing for a number of times equal to the number of elements included in the set C spanned by the reference symbols $X_t$, in each case assigning a different value to $X_t$. As those blocks are also included in 320, this means that this has to be done for each t=1, ..., T.

Block 606 represents, according to an embodiment, the means for or step of computing $\hat{x}^{t\ D}(\overline{X})$ as exemplified in equations (32)-(34).

Block 608 represents, according to an embodiment, the means for or step of computing $x^{t\ A}(\overline{X})$ as exemplified in equations (30) and (36).

Block 610 represents, according to an embodiment, the means for or step of determining the desired set of candidate transmit sequences $U_t(\overline{x})$.

Block 612 represents, according to an embodiment, the means for or step of determining a subset of sequences $S_t(\overline{x})$ as shown in equation (8) or alternatively $S'_t(\overline{x})$ as shown in equation (10), and storing the related metric $D(X)$ for $x \in S_t(\overline{X})$ (or alternatively $x \in S'_t(\overline{X})$).

Block 614 represents, according to an embodiment, the means for or step of computing the a-posteriori bit LLRs $L_p$ as shown in equation (13). Once $L_p$ are available, a final subtraction of the input a-priori LLRs is sufficient to generate the extrinsic $L_e$ as for equation (7, i.e. the extrinsic information ($L_e$) is calculated from the a-priori information ($L_a$) and the a-posteriori information ($L_p$).).

Referring to FIG. 6B, block 320 includes all the blocks that have to repeat their processing for a number of times equal to the number of transmit antennas, each time changing some parameter, or reading different memory stored values, related to the such transmit antenna index.

Block 602 represents, according to an embodiment, the means for or step of pre-processing the system equation (1) and particularly of the channel matrix and the received vector, in order to factorize the channel matrix into a product of matrices one of which is a triangular matrix. As an illustrative example, the channel matrix can be decomposed into the product of an orthogonal matrix and a triangular matrix. The process is repeated for a number of times equal to the number of transmit antennas, where each time the column of the input the channel matrix are disposed according to a different order.

Block 604 includes, according to an embodiment, all the blocks that repeat their processing for a number of times equal to the number of elements included in the set C spanned by the reference symbols $X_t$, in each case assigning a different value to $X_t$. As those blocks are also included in 600, this means that this has to be done for each t=1, ..., T.

Block 616 represents, according to an embodiment, the means for or step of determining the desired set of candidate transmit sequences $U_t(\overline{X})$.

Block 612 represents, according to an embodiment, the means for or step of determining a subset of sequences $S_t(\overline{X})$ as shown in equation (8) or alternatively $S'_t(\overline{X})$ as shown in equation (10), and storing the related metric $D(X)$ for $x \in S_t(\overline{X})$ (or alternatively $x \in S'_t(\overline{X})$).

Block 614 represents, according to an embodiment, the means for or step of computing the a-posteriori bit LLRs $L_p$ as shown in equation (13). Once $L_p$ are available, a final subtraction of the input a-priori LLRs is sufficient to generate the extrinsic $L_e$ as for equation (7).

As noted above, channel state information is assumed to be known at the receiver. Therefore, the receiver may include a set of rules having as input:

the (complex) received vector observations,
the (complex) gain channel paths between the transmit and receive antennas, and the properties of the desired QAM (or PSK) constellation to which the symbols belong.

Consequently, without prejudice to the underlying principles of the invention, the details and the embodiments may vary, even appreciably, with reference to what has been described by way of example only, without departing from the scope of the invention.

LIST OF REFERENCES

[1] I. E. Telatar, "Capacity of Multi-Antenna Gaussian Channels," Eur. Trans. Tel., 10, 6, 585-595, November, 1999.

[2] G. J. Foschini and M. Gans, "On the Limits of Wireless Communication in a Fading Environment," Wireless Pers. Comm., 6, 311-355, March, 1998.

[3] IEEE P802.11n™/D1.0, "Draft Amendment to [ . . . ]—Part 11: Wireless LAN Medium Access Control (MAC) and Physical Layer (PHY) specifications: Enhancements for Higher Throughput", A. Stephens et al.

[4] IEEE Project P802.16-2004/Cor1-D5, Draft Corrigendum to IEEE Standard for Local and Metropolitan Area Networks—Part 16: Air Interface for Fixed Broadband Wireless Access Systems.

[5] Requirements and recommendations for WiMAX Forum™ Mobility Profiles, WiMAX, Service Providers Working Group, November 2005.

[6] W. van Etten, "Maximum Likelihood Receiver for Multiple Channel Transmission Systems", IEEE Trans. on Comms, Vol. 24, No. 2, pp. 276-283, February 1976.

[7] C. Berrou, A. Glavieux and P. Thitimajshima, "Near Shannon limit error-correction coding and decoding: Turbo codes", Proc. ICC 1993, pp 1064-1070, May 1993.

[8] C. Douillard et al., "Iterative Correction of Intersymbol Interference: Turbo-Equalization", European Trans. on Telecomm. and Rel. Techn., vol. 6, pp. 507-511, September 1995.

[9] H. V. Poor and S. Verdu', "Probability of Error in MMSE Multiuser Detection", IEEE Trans. on Information Theory, Vol. 43, May 1997, pp. 858-871.

[10] P. W. Wolniansky, G. J. Foschini, G. D. Golden, R. A. Valenzuela, "V-BLAST: An Architecture for Realizing Very High Data Rates Over the Rich-Scattering Wireless Channel," invited paper, Proc. ISSSE-98, Pisa, Italy, Sep. 29, 1998.

[11] G. J. Foschini, G. D. Golden, R. A. Valenzuela, P. W. Wolniansky, "Simplified Processing for High Spectral Efficiency Wireless Communications employing multi-element arrays," IEEE Journal on Selected Areas in Communications, vol. 17, no. 11, pp. 1841-1852, November 1999.

[12] M. Sellathurai and S. Haykin, "Turbo-BLAST for wireless communications: Theory and experiments", IEEE Trans. on Sign. Proc., vol. 50, pp. 2538-2546, October 2002.

[13] B. Lu, G. Yue, and X. Wang, "Performance analysis and design optimization of LDPC coded MIMO OFDM systems," IEEE Trans. Signal Proc., xxx

[14] D. Zuyderhoff, X. Wautelet et al., "MMSE Turbo Receiver for space-frequency bit-interleaved coded OFDM", Proc. IEEE Vehicular Technology Conf., vol. 1, pp. 567-571, October 2003.

[15] W.-J. Choi, R. Negri and J. M. Cioffi, "Combined ML and DFE Decoding for the V-BLAST System", Proc. IEEE Int. Conf. on Communications, Vol. 3, pp. 1243-1248, June 2000.

[16] Y. Li and Z. Q. Luo, "Parallel Detection for V-BLAST System", IEEE GLOBECOM, Vol. 1, pp. 340-344, May 2002.

[17] D. W. Waters and J. R. Barry, "The Chase Family of Detection Algorithms for Multiple-Input Multiple-Ouput Channels", IEEE GLOBECOM, Vol. 4, pp. 2635-2639, November 2004.

[18] D. W. Waters and J. R. Barry, "The Chase Family of Detection Algorithms for Multiple-Input Multiple-Ouput Channels", Submitted to IEEE Trans. on Information Theory, September 2005

[19] E. Agrell, T. Eriksson et al., "Closest Point Search in Lattices," IEEE Trans. on Inf. Theory, Vol. 48, No. 8, August 2002.

[20] M. O. Damen, A. Chkeif and J.-C. Belfiore, "Lattice Codes Decoder for Space-Time Codes", IEEE Commun. Letters, Vol. 4, No. 5, pp. 161-163, May 2000.

[21] M. Siti and M. P. Fitz, "A novel soft-output layered orthogonal lattice detector for multiple antenna communications.", Proc. IEEE Int. Conf. on Communications, June, 2006.

[22] A. Tomasoni, M.Ferrari, D. Gatti, F. Osnato and S. Bellini, "A Low Complexity Turbo MMSE Receiver for W-LAN MIMO Systems", Proc. IEEE Int. Conf. on Communications, June, 2006.

[23] Yutak Yasuda, Kanshiro Kashiki and Yasuo Hirata, "High-Rate Punctured Convolutional Codes for Soft Decision Viterbi Decoding", IEEE Transactions On Communications, Vol. COM-32, No. 3, pp. 315-319, March 1984.

[24] S. Dolinar, D. Divsalar, "Weight Distributions for Turbo Codes Using Random and Nonrandom Permutations", JPL TDA Progr, Rep., vol 42-122, August 1995.

[25] E. Viterbo, J. Boutros, "A Universal Lattice Code Decoder for Fading Channels," IEEE Trans. on Inf. Theory, Vol. 45, No. 5, July 1999.

[26] Damen, El Gamal, G. Caire, "On Maximum-Likelihood Detection and the Search for the Closest Lattice Point," IEEE Trans. on Inf. Theory, Vol. 49, No. 10, October 2003.

[27] Van Nee, Van Zelst, "Maximum likelihood decoding in a space division multiplexing system," Awater, Proc. VTC 2000, vol. 1, 6-10.

[28] IEEE 802.11-05/0149r1, "WWiSE Proposal: High throughput extension to the 802.11 Standard," C. Kose, B. Edwards et al.

[29] B. Hassibi, "An efficient square-root algorithm for BLAST," in Proc. ICASSP, Istanbul, Turkey, pp. 11737-11740, June 2000.

[30] G. H. Golub and C. F. Van Loan, "Matrix Computations", Johns Hopkins University Press, Baltimore, Md., 1996.

What is claimed is:

1. A method for detecting sequences of digitally modulated symbols, said modulated symbols being transmitted by multiple transmitting sources and received by multiple receiving elements and grouped as a received vector of sequences of digitally modulated symbols, said method including:
   identifying a set of values for at least one reference transmit symbol, the possible values representing candidate values;
   estimating for each candidate value at least one further set of sequences of the remaining transmitted symbols;
   determining for each candidate value a set of sequences of transmitted symbols obtained by grouping said candidate values and said estimated at least one further set of sequences of the remaining transmitted symbols;
   calculating a metric for each of said determined sequences of transmitted symbols;
   selecting the sequence that maximizes said metric, one respective selected sequence for each candidate value;
   storing the values of the related metrics and the associated selected sequences;

receiving a channel-state information matrix from a first module and a-priori information on said modulated symbols from a second module;
processing said channel-state-information matrix using a triangularization of said channel-state-information matrix;
wherein said channel-state-information matrix includes a complex channel-state-information matrix; and
wherein processing said channel-state-information matrix includes factorizing said channel-state-information matrix into an orthogonal matrix and a triangular matrix.

2. The method of claim 1, wherein said method includes ordering the layers considered for the detection.

3. The method of claim 1, wherein said at least one further set of sequences of transmitted symbols is estimated from at least:
said vector of received sequences of digitally modulated symbols,
said channel state information matrix, and
said a-priori information.

4. The method of claim 1, wherein said metric is calculated from at least:
said vector of received sequences of digitally modulated symbols,
said channel state information matrix, and
said a-priori information.

5. The method of claim 1, wherein at least the estimating, determining, and calculating are performed in the complex domain by calculating real and imaginary parts.

6. The method of claim 1 wherein said number of receiving elements is equal to the number of transmitting sources minus one.

7. The method of claim 6, wherein processing said channel-state-information matrix includes factorizing said channel-state-information matrix into an orthogonal matrix and a triangular matrix with its last row having only a single element.

8. The method of claim 1, wherein:
said vector of received sequences of digitally modulated symbols includes a complex vector; and
processing said complex vector of received sequences of digitally modulated symbols includes multiplying said transpose conjugate of the orthogonal matrix by said received vector.

9. The method of claim 1, wherein said calculating a metric for each said sequences of transmitted symbols includes calculating an a-posteriori probability metric.

10. The method of claim 1, further comprising calculating a-posteriori bit soft output information for said selected sequence from said set of metrics for said sequences.

11. The method of claim 10, further comprising calculating extrinsic information from said a-priori information and said a-posteriori information.

12. The method of claim 11, wherein said extrinsic information is fed to a module.

13. The method of claim 12, wherein said module is a forward-error-correction-code decoder.

14. The method of claim 1 wherein said transmitting sources and said receiving elements include antennas.

15. A device for detecting sequences of digitally modulated symbols, said modulated symbols being transmitted by multiple transmitting sources and received by multiple receiving elements, the device configured for performing the method of claim 1.

16. A receiver for receiving digitally modulated symbols, the receiver including the device of claim 15.

17. A computer program product loadable into the memory of a computer and comprising software code portions adapted for performing the steps of claim 1 when the product is run on a computer.

18. A method for detecting sequences of digitally modulated symbols, said modulated symbols being transmitted by multiple transmitting sources and received by multiple receiving elements and aroused as a received vector of sequences of digitally modulated symbols, said method including:
identifying a set of values for at least one reference transmit symbol, the possible values representing candidate values;
estimating for each candidate value at least one further set of sequences of the remaining transmitted symbols;
determining for each candidate value a set of sequences of transmitted symbols obtained by grouping said candidate values and said estimated at least one further set of sequences of the remaining transmitted symbols;
calculating a metric for each of said determined sequences of transmitted symbols;
selecting the sequence that maximizes said metric, one respective selected sequence for each candidate value;
storing the values of the related metrics and the associated selected sequences;
receiving a channel-state information matrix from a first module and a-priori information on said modulated symbols from a second module;
processing said channel-state-information matrix using a triangualrization of said channel-state-information matrix;
wherein said channel-state-information matrix includes a complex channel-state-information matrix; and
processing said complex channel-state-information matrix includes
forming a Gram matrix using said channel-state-information matrix,
performing a Cholesky decomposition of said Gram matrix, and
calculating a Moore-Penrose matrix as an inverse of said channel-state-information matrix, resulting in a pseudo-inverse matrix.

19. The method of claim 18, wherein:
said vector of received sequences of digitally modulated symbols includes a complex vector; and
processing said complex vector of received sequences of digitally modulated symbols includes multiplying said pseudo-inverse matrix by the complex vector of received sequences.

20. A method for detecting sequences of digitally modulated symbols, said modulated symbols being transmitted by multiple transmitting sources and received by multiple receiving elements and grouped as a received vector of sequences of digitally modulated symbols, said method including:
identifying a set of values for at least one reference transmit symbol, the possible values representing candidate values;
estimating for each candidate value at least one further set of sequences of the remaining transmitted symbols;
determining each candidate value a set of sequences of transmitted symbols obtained by grouping said candidate values and said estimated at least one further set of sequences of the remaining transmitted symbols;
calculating a metric for each of said determined sequences of transmitted symbols;

selecting the sequence that maximizes said metric one respective selected sequence for each candidate value;

storing the values of the related metrics and the associated selected sequences;

wherein said estimating for each candidate value at least one further set of sequences of the remaining transmitted symbols includes calculating the Euclidean distance term between said vector of received sequences of digitally modulated symbols and the product of the channel-state-information matrix and a possible transmit sequence, selecting as one candidate sequence of possible transmitted symbols the possible transmitted sequence with the smallest value of said Euclidean distance term, and selecting as a further candidate sequence of the remaining transmit symbols the transmit sequence with the largest a-priori information of said symbol sequences.

21. The method of claim 20, wherein said estimating for each candidate value at least one further set of sequence of transmitted symbols includes selecting as a further candidate sequence of the remaining transmit symbols the transmit sequence with the second largest a-priori information of said symbol sequence.

22. The method of claim 20, wherein said calculating a-posteriori probability metric includes summing the opposite of said Euclidean distance term to said a-priori probability term for said selected candidate sequences.

23. The method of claim 22, wherein said selecting the sequence that maximizes said metric includes selecting said sequence that maximizes the sum of the opposite of said Euclidean distance term and said a-priori probability term.

24. The method of claim 20, wherein said selecting as a candidate sequence of the possible transmitted symbols the transmit sequence with the smallest value of said Euclidean distance term includes estimating said Euclidean distance term through spatial decision feedback equalization of the remaining transmit symbols, starting from each candidate value of the reference transmitted symbol.

25. A method for detecting sequences of digitally modulated symbols, said modulated symbols being transmitted by multiple transmitting sources and received by multiple receiving elements and grouped as a received vector of sequences of digitally modulated symbols, said method including:

identifying a set of values for at least one reference transmit symbol, the possible values representing candidate values;

estimating for each candidate value at least one further set of sequences of the remaining transmitted symbols;

determining for each candidate value a set of sequences of transmitted symbols obtained by grouping said candidate values and said estimated at least one further set of sequences of the remaining transmitted symbols;

calculating a metric for each of said determined sequences of transmitted symbols;

selecting the sequence that maximizes said metric, one respective selected sequence for each candidate value;

storing values of the related metrics and the associated selected sequences;

receiving a channel-state information matrix from a first module and a-priori information on said modulated symbols from a second module;

processing said channel-state-information matrix using a trianqularization of said channel-state-information matrix;

wherein said estimating for each candidate value at least one further set of sequences of the remaining transmitted symbols includes estimating the remaining transmit symbols in turn one at a time, in a successive-detection fashion, calculating the partial Euclidean distance term associated with the transmit symbol to be estimated;

selecting as one candidate transmitted symbol the transmitted symbol with the smallest value of said partial Euclidean distance term;

selecting as further candidate transmitted symbol the transmit symbol with the largest a-priori information of said symbol;

calculating the partial a-posteriori probability metric associated with the transmit symbol to be estimated; and selecting as an estimated transmit symbol the symbol that maximizes said partial a-posteriori probability metric.

26. The method of claim 25, wherein said estimating the remaining transmit symbols in turn one at a time, in a successive detection fashion includes selecting at least as a further candidate transmitted symbol the transmitted symbol with the second largest a-priori information of said symbol.

27. The method of claim 25, wherein said calculating the partial Euclidean distance term associated with the transmit symbol to be estimated includes computing the square magnitude of the difference between a processed received vector scalar term, and a summation of products, each product involving a coefficient of a triangularized channel-state-information matrix and a corresponding transmit-symbol estimate.

28. The method of claim 25, wherein said calculating the partial a-posteriori probability metric includes summing the opposite of said partial Euclidean distance term to said a-priori probability term for said selected candidate symbols.

29. A method for detecting sequences of digitally modulated symbols, said modulated symbols being transmitted by multiple transmitting sources and received by multiple receiving elements and grouped as a received vector of sequences of digital modulated symbols, said method including:

identifying a set of values for at least one reference transmit symbol, the possible values representing candidate values;

estimating for each candidate value at least one further set of sequences of the remaining transmitted symbols;

determining for each candidate value a set of sequences of transmitted symbols obtained by grouping said candidate values and said estimated at least one further set of sequences of the remaining transmitted symbols;

calculating a metric for each of said determined sequences of transmitted symbols;

selecting the sequence that maximizes said metric, one respective selected sequence for each candidate value;

storing the values of the related metrics and the associated selected sequences; and generating bit soft-output information for the bits corresponding to the symbols transmitted by all the antennas by repeating the considered steps and operations a number of times equal to a number of transmit antennas, each time associated with a different disposition of layers corresponding to the transmitted symbols, each layer being a reference layer in only one of the dispositions, and disposing the columns of the channel matrix accordingly prior to further processing.

30. A method for detecting sequences of digitally modulated symbols, said modulated symbols being transmitted by multiple transmitting sources and received by multiple receiving elements and grouped as a received vector of sequences of digitally modulated symbols, said method including:
- identifying a set of values for at least one reference transmit symbol, the possible values representing candidate values;
- estimating for each candidate value at least one fu her set o sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric one respective selected sequence for each candidate value;
- storing the values of the related metrics and the associated selected sequences;
- receiving a channel-state information matrix from a first module and a-priori information on said modulated symbols from a second module;
- calculating a-posteriori bit soft output information for said selected sequence from said set of metrics for said sequences;
- calculating extrinsic information from said a-priori information and said a-posteriori information;
- feeding said extrinsic information to a module; and
- updating said a-priori information on said modulated symbols from said module in response to said information at each processing instance.

31. The method of claim 30, wherein said extrinsic information is calculated in at least two processing instances by:
- calculating in a first instance the extrinsic information without any a-priori information, and
- calculating in a second instance the extrinsic information from the a-priori information fed back from said module, until a decision on the bit value is made after a given number of instances.

32. The method of claim 31, wherein said processing instances are selected as processing iterations or processing stages.

33. A method for detecting sequences of digitally modulated Symbols, said modulated symbols being transmitted by multiple transmitting sources and received by multiple receiving elements and grouped as a received vector of sequences of digitally modulated symbols, said method including:
- identifying a set of values for at least one reference transmit symbol, the possible values representing candidate values;
- estimating for each candidate value at least one further set of sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric, one respective selected sequence for each candidate value;
- storing the values of the related metrics and the associated selected sequences; and
- wherein identifying a set of values for at least one reference transmit symbol, the possible values representing candidate values, includes determining a set of possible values whose cardinality changes as a function of the considered processing iteration, and typically is reduced for an increasing number of iterations.

34. A method for detecting sequences of digitally modulated symbols, said modulated symbols being transmitted by multiple transmitting sources and received by multiple receiving elements and grouped as a received vector of sequences of digitally modulated symbols, said method including:
- identifying in a set of values for at least one reference transmit symbol, the possible values representing candidate values;
- estimating for each candidate value at least one further set of sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric, one respective selected sequence for each candidate value;
- storing the values of the related metrics and the associated selected sequences; and
- performing at least one mathematical operation in the real domain by separately treating the in-phase and quadrature-phase components of at least a received vector of said sequences of digitally modulated symbols, a channel-state-information matrix, and a transmitted vector transmitted by said transmitting sources.

35. A method for detecting sequences of digitally modulated symbols, said modulated symbols being transmitted by multiple transmitting sources and received by multiple receiving elements and grouped as a received vector of sequences of digitally modulated symbols, said method including:
- identifying a set of values for at least one reference transmit symbol, the possible values representing candidate values;
- estimating for each candidate value at least one further set of sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric, one respective selected sequence for each candidate value;
- storing the values of the related metrics and the associated selected sequences;
- receiving a channel-state information matrix from a first module and a-priori information on said modulated symbols from a second module;
- calculating a-posteriori bit soft output information for said selected sequence from said set of metrics for said sequences;
- calculating extrinsic information from said a-priori information and said a-posteriori information;
- feeding said extrinsic information to a module; and
- exchanging said extrinsic information and said a-priori information as values in the logarithmic domain.

36. A method for detecting sequences of digitally modulated symbols, said modulated symbols being transmitted by multiple transmitting sources and received by multiple receiving elements and grouped as a received vector of sequences of digitally modulated symbols, said method including:
- identifying a set of values for at least one reference transmit symbol, the possible values representing candidate values;
- estimating for each candidate value at least one further set of sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric, one respective selected sequence for each candidate value;
- storing the values of the related metrics and the associated selected sequences;
- receiving a channel-state information matrix from a first module and a-priori information on said modulated symbols from a second module;
- calculating a-posteriori bit soft output information for said selected sequence from said set of metrics for said sequences;
- calculating extrinsic information from said a-priori information and said a-posteriori information;
- feeding said extrinsic information to a module;
- subjecting said a-priori information from said module to interleaving before said sequences are detected; and
- subjecting said soft-output information to de-interleaving before feeding to said module.

37. A method for detecting sequences of digitally modulated symbols, said modulated symbols being transmitted by multiple transmitting sources and received by multiple receiving elements and grouped as a received vector of sequences of digitally modulated symbols, said method including:
- receiving a complex channel-state information matrix from a first module and a-priori information on said modulated symbols from a second module;
- factorizing said channel-state-information matrix into an orthogonal matrix and a triangular matrix;
- identifying a set of values for at least one reference transmit symbol, the possible values representing candidate values;
- estimating for each candidate value at least one further set of sequences of the remaining transmitted symbols;
- determining for each candidate value a set of sequences of transmitted symbols obtained by grouping said candidate values and said estimated at least one further set of sequences of the remaining transmitted symbols;
- calculating a metric for each of said determined sequences of transmitted symbols;
- selecting the sequence that maximizes said metric, one respective selected sequence for each candidate value; and
- storing the values of the related metrics and the associated selected sequences.

38. An apparatus for detecting sequences of digitally modulated symbols, said modulated symbols being transmitted by multiple transmitting sources and received by multiple receiving elements and grouped as a received vector of sequences of digitally modulated symbols, said method including:
- a first module configured to receive the digitally modulated symbols from the receiving elements, to generate a complex channel-state information matrix, and to factorize said channel-state-information matrix into an orthogonal matrix and a triangular matrix;
- a second module configured to generate a-priori information on said modulated symbols;
- a third module configured
  - to identify a set of values for at least one reference transmit symbol, the possible values representing candidate values,
  - to estimate for each candidate value at least one further set of sequences of the remaining transmitted symbols,
  - to determine for each candidate value a set of sequences of transmitted symbols obtained by grouping said candidate values and said estimated at least one further set of sequences of the remaining transmitted symbols,
  - to calculate a metric for each of said determined sequences of transmitted symbols,
  - to select the sequence that maximizes said metric, one respective selected sequence for each candidate value; and
- a memory configured to store the values of the related metrics and the associated selected sequences.

39. A tangible computer-medium storing instructions that, when executed by a computing apparatus, cause the computing apparatus, or another apparatus under the control of the computing apparatus to detect sequences of digitally modulated symbols, said modulated symbols being transmitted by multiple transmitting sources and received by multiple receiving elements and grouped as a received vector of sequences of digitally modulated symbols, by:
- generating a complex channel-state information matrix;
- factorizing said channel-state-information matrix into an orthogonal matrix and a triangular matrix;
- generating a-priori information on said modulated symbols;
- identifying a set of values for at least one reference transmit symbol, the possible values representing candidate values,
- estimating for each candidate value at least one further set of sequences of the remaining transmitted symbols,
- determining for each candidate value a set of sequences of transmitted symbols obtained by grouping said candidate values and said estimated at least one further set of sequences of the remaining transmitted symbols,
- calculating a metric for each of said determined sequences of transmitted symbols,
- selecting the sequence that maximizes said metric, one respective selected sequence for each candidate value; and
- storing the values of the related metrics and the associated selected sequences.

* * * * *

UNITED STATES PATENT AND TRADEMARK OFFICE
CERTIFICATE OF CORRECTION

| | |
|---|---|
| PATENT NO. | : 8,432,987 B2 |
| APPLICATION NO. | : 12/077073 |
| DATED | : April 30, 2013 |
| INVENTOR(S) | : Massimiliano Siti et al. |

It is certified that error appears in the above-identified patent and that said Letters Patent is hereby corrected as shown below:

In the Claims

Claim 20, Column 30, line 62, the phrase "determining each candidate value" should read --determining for each candidate value--

Claim 30, Column 33, line 10, the phrase "value at least one fu her set o sequences" should read --value at least one further set of sequences--

Claim 33, Column 33, lines 45 and 46, the phrase "digitally modulated Symbols, said modulated symbols being" should read --digitally modulated symbols, said modulated symbols being--

Claim 34, Column 34, line 12, the phrase "identifying in a set of values" should read --identifying a set of values--

Signed and Sealed this
Twenty-fourth Day of June, 2014

Michelle K. Lee
*Deputy Director of the United States Patent and Trademark Office*